(12) United States Patent
Pope et al.

(10) Patent No.: US 11,249,938 B2
(45) Date of Patent: Feb. 15, 2022

(54) PROGRAMMED INPUT/OUTPUT MODE

(71) Applicant: XILINX, INC., San Jose, CA (US)

(72) Inventors: Steven L. Pope, Cambridge (GB);
David J. Riddoch, Huntingdon (GB);
Dmitri Kitariev, Costa Mesa, CA (US)

(73) Assignee: XILINX, INC., San Jose, CA (US)

( * ) Notice: Subject to any disclaimer, the term of this patent is extended or adjusted under 35 U.S.C. 154(b) by 88 days.

(21) Appl. No.: 16/551,477

(22) Filed: Aug. 26, 2019

(65) Prior Publication Data

US 2019/0377704 A1 Dec. 12, 2019

Related U.S. Application Data

(63) Continuation of application No. 14/073,735, filed on Nov. 6, 2013, now Pat. No. 10,394,751.

(51) Int. Cl.
*H04L 12/26* (2006.01)
*G06F 15/173* (2006.01)
(Continued)

(52) U.S. Cl.
CPC ...... *G06F 15/17331* (2013.01); *G06F 13/385* (2013.01); *H04L 43/0888* (2013.01);
(Continued)

(58) Field of Classification Search
CPC ............... H04L 63/0485; H04L 49/901; H04L 49/9047; H04L 67/2842; H04L 49/3009;
(Continued)

(56) References Cited

U.S. PATENT DOCUMENTS 5,272,599 A 12/1993 Koenen
5,307,459 A 4/1994 Petersen et al.
(Continued)

FOREIGN PATENT DOCUMENTS

EP 620521 A2 10/1994
WO 2001048972 A1 7/2001
(Continued)

OTHER PUBLICATIONS

Thekkath, C. A., et al., "Implementing network protocols at user level," ACM Computer Communication Review, vol. 23, No. 4, 1993, Oct. 1993, pp. 64-73.
(Continued)

*Primary Examiner* — Jungwon Chang
(74) *Attorney, Agent, or Firm* — Haynes Beffel & Wolfeld LLP; Andrew L. Dunlap; Paul A. Durdik

(57) ABSTRACT

A data processing system and method are provided. A host computing device comprises at least one processor. A network interface device is arranged to couple the host computing device to a network. The network interface device comprises a buffer for receiving data for transmission from the host computing device. The processor is configured to execute instructions to transfer the data for transmission to the buffer. The data processing system further comprises an indicator store configured to store an indication that at least some of the data for transmission has been transferred to the buffer wherein the indication is associated with a descriptor pointing to the buffer.

19 Claims, 10 Drawing Sheets

(51) Int. Cl.
*G06F 13/38* (2006.01)
*G06F 3/06* (2006.01)
*G06F 13/28* (2006.01)
*H04L 29/08* (2006.01)
*G06F 9/455* (2018.01)
*H04L 12/861* (2013.01)

(52) U.S. Cl.
CPC .......... *G06F 3/061* (2013.01); *G06F 9/45533* (2013.01); *G06F 13/28* (2013.01); *G06F 2213/3808* (2013.01); *H04L 49/90* (2013.01); *H04L 67/1097* (2013.01); *H04L 67/2842* (2013.01)

(58) Field of Classification Search
CPC . H04L 43/0888; H04L 67/1097; H04L 49/90; G06F 15/17331; G06F 13/385; G06F 13/28; G06F 3/061; G06F 9/45533; G06F 2213/3808
See application file for complete search history.

(56) References Cited

U.S. PATENT DOCUMENTS

| | | | |
|---|---|---|---|
| 5,325,532 A | 6/1994 | Crosswy et al. |
| 5,946,189 A | 8/1999 | Koenen et al. |
| 6,098,112 A | 8/2000 | Ishijima et al. |
| 6,160,554 A | 12/2000 | Krause |
| 6,304,945 B1 | 10/2001 | Koenen |
| 6,349,035 B1 | 2/2002 | Koenen |
| 6,438,130 B1 | 8/2002 | Kagan et al. |
| 6,502,203 B2 | 12/2002 | Barron et al. |
| 6,530,007 B2 | 3/2003 | Olarig et al. |
| 6,667,918 B2 | 12/2003 | Leader et al. |
| 6,718,392 B1 | 4/2004 | Krause |
| 6,728,743 B2 | 4/2004 | Shachar |
| 6,735,642 B2 | 5/2004 | Kagan et al. |
| 6,768,996 B1 | 7/2004 | Steffens et al. |
| 6,904,534 B2 | 6/2005 | Koenen |
| 6,950,961 B2 | 9/2005 | Krause et al. |
| 6,978,331 B1 | 12/2005 | Kagan et al. |
| 7,093,158 B2 | 8/2006 | Barron et al. |
| 7,099,275 B2 | 8/2006 | Sarkinen et al. |
| 7,103,626 B1 | 9/2006 | Recio et al. |
| 7,103,744 B2 | 9/2006 | Garcia et al. |
| 7,136,397 B2 | 11/2006 | Sharma |
| 7,143,412 B2 | 11/2006 | Koenen |
| 7,149,227 B2 | 12/2006 | Stoler et al. |
| 7,151,744 B2 | 12/2006 | Sarkinen et al. |
| 7,216,225 B2 | 5/2007 | Haviv et al. |
| 7,234,004 B2 | 6/2007 | Raisch |
| 7,240,350 B1 | 7/2007 | Eberhard et al. |
| 7,245,627 B2 | 7/2007 | Goldenberg et al. |
| 7,254,237 B1 | 8/2007 | Jacobson et al. |
| 7,285,996 B2 | 10/2007 | Fiedler |
| 7,316,017 B1 | 1/2008 | Jacobson et al. |
| 7,346,702 B2 | 3/2008 | Haviv |
| 7,386,619 B1 | 6/2008 | Jacobson et al. |
| 7,403,535 B2 | 7/2008 | Modi et al. |
| 7,404,190 B2 | 7/2008 | Krause et al. |
| 7,502,826 B2 | 3/2009 | Barron et al. |
| 7,509,355 B2 | 3/2009 | Hanes et al. |
| 7,518,164 B2 | 4/2009 | Smelloy et al. |
| 7,551,614 B2 | 6/2009 | Teisberg et al. |
| 7,554,993 B2 | 6/2009 | Modi et al. |
| 7,573,967 B2 | 8/2009 | Fiedler |
| 7,580,415 B2 | 8/2009 | Hudson et al. |
| 7,580,495 B2 | 8/2009 | Fiedler |
| 7,617,376 B2 | 11/2009 | Chadalapaka et al. |
| 7,631,106 B2 | 12/2009 | Goldenberg et al. |
| 7,636,703 B2 | 12/2009 | Taylor |
| 7,650,386 B2 | 1/2010 | McMahan et al. |
| 7,653,754 B2 | 1/2010 | Kagan et al. |
| 7,688,853 B2 | 3/2010 | Santiago et al. |
| 7,702,629 B2 | 4/2010 | Cytron et al. |
| 7,757,232 B2 | 7/2010 | Hilland et al. |
| 7,801,027 B2 | 9/2010 | Kagan et al. |
| 7,802,071 B2 | 9/2010 | Oved |
| 7,813,460 B2 | 10/2010 | Fiedler |
| 7,827,442 B2 | 11/2010 | Sharma et al. |
| 7,835,375 B2 | 11/2010 | Sarkinen et al. |
| 7,848,322 B2 | 12/2010 | Oved |
| 7,856,488 B2 | 12/2010 | Cripe et al. |
| 7,864,787 B2 | 1/2011 | Oved |
| 7,904,576 B2 | 3/2011 | Krause et al. |
| 7,921,178 B2 | 4/2011 | Haviv |
| 7,929,539 B2 | 4/2011 | Kagan et al. |
| 7,930,437 B2 | 4/2011 | Kagan et al. |
| 7,934,959 B2 | 5/2011 | Rephaeli et al. |
| 7,937,499 B1 * | 5/2011 | Tripathi ............. H04L 49/9047 709/250 |
| 7,945,528 B2 | 5/2011 | Cytron et al. |
| 7,954,114 B2 | 5/2011 | Chamberlain et al. |
| 7,978,606 B2 | 7/2011 | Buskirk et al. |
| 8,000,336 B2 | 8/2011 | Harel |
| 8,156,101 B2 | 4/2012 | Indeck et al. |
| 8,326,816 B2 | 12/2012 | Colle et al. |
| 8,375,145 B2 | 2/2013 | Kagan et al. |
| 9,479,464 B1 | 10/2016 | Wang et al. |
| 2002/0059052 A1 | 5/2002 | Bloch et al. |
| 2002/0112139 A1 | 8/2002 | Krause et al. |
| 2002/0129293 A1 | 9/2002 | Hutton et al. |
| 2002/0140985 A1 | 10/2002 | Hudson |
| 2002/0156784 A1 | 10/2002 | Hanes et al. |
| 2002/0165897 A1 | 11/2002 | Kagan et al. |
| 2003/0007165 A1 | 1/2003 | Hudson |
| 2003/0033588 A1 | 2/2003 | Alexander |
| 2003/0058459 A1 | 3/2003 | Wu et al. |
| 2003/0063299 A1 | 4/2003 | Cowan et al. |
| 2003/0065856 A1 | 4/2003 | Kagan et al. |
| 2003/0081060 A1 | 5/2003 | Zeng et al. |
| 2003/0086300 A1 | 5/2003 | Noyes et al. |
| 2003/0172330 A1 | 9/2003 | Barron et al. |
| 2003/0191786 A1 | 10/2003 | Matson et al. |
| 2003/0202043 A1 | 10/2003 | Zeng et al. |
| 2003/0214677 A1 | 11/2003 | Bhaskar et al. |
| 2004/0015502 A1 | 1/2004 | Alexander et al. |
| 2004/0071142 A1 * | 4/2004 | Moriwaki ........... H04L 49/3009 370/392 |
| 2004/0071250 A1 | 4/2004 | Bunton et al. |
| 2004/0141642 A1 | 7/2004 | Zeng et al. |
| 2004/0190533 A1 | 9/2004 | Modi et al. |
| 2004/0190538 A1 | 9/2004 | Bunton et al. |
| 2004/0190557 A1 | 9/2004 | Barron |
| 2004/0193734 A1 | 9/2004 | Barron et al. |
| 2004/0193825 A1 | 9/2004 | Garcia et al. |
| 2004/0210754 A1 | 10/2004 | Barron et al. |
| 2004/0249998 A1 | 12/2004 | Rajagopalan et al. |
| 2004/0252685 A1 | 12/2004 | Kagan et al. |
| 2005/0008223 A1 | 1/2005 | Zeng et al. |
| 2005/0018221 A1 | 1/2005 | Zeng et al. |
| 2005/0038918 A1 | 2/2005 | Hilland et al. |
| 2005/0038941 A1 | 2/2005 | Chadalapaka et al. |
| 2005/0039171 A1 | 2/2005 | Avakian et al. |
| 2005/0039172 A1 | 2/2005 | Rees et al. |
| 2005/0039187 A1 | 2/2005 | Avakian et al. |
| 2005/0066333 A1 | 3/2005 | Krause et al. |
| 2005/0172181 A1 | 8/2005 | Huliehel |
| 2005/0177657 A1 * | 8/2005 | Pope ........................ G06F 13/24 710/36 |
| 2005/0213603 A1 * | 9/2005 | Karighattam ....... H04L 63/0485 370/463 |
| 2005/0219278 A1 | 10/2005 | Hudson |
| 2005/0219314 A1 | 10/2005 | Donovan et al. |
| 2005/0231751 A1 | 10/2005 | Wu et al. |
| 2006/0026443 A1 | 2/2006 | McMahan et al. |
| 2006/0034310 A1 | 2/2006 | Connor |
| 2006/0045098 A1 | 3/2006 | Krause |
| 2006/0126619 A1 | 6/2006 | Teisberg et al. |
| 2006/0150199 A1 | 7/2006 | Callender |
| 2006/0156198 A1 | 7/2006 | Boyce et al. |
| 2006/0165074 A1 | 7/2006 | Modi et al. |
| 2006/0193318 A1 | 8/2006 | Narasimhan et al. |
| 2006/0228637 A1 | 10/2006 | Jackson et al. |

(56) References Cited

U.S. PATENT DOCUMENTS

| | | |
|---|---|---|
| 2006/0248191 A1 | 11/2006 | Hudson et al. |
| 2006/0288129 A1 | 12/2006 | Pope et al. |
| 2007/0188351 A1 | 8/2007 | Brown et al. |
| 2007/0220183 A1 | 9/2007 | Kagan et al. |
| 2007/0237327 A1 | 10/2007 | Taylor et al. |
| 2007/0260602 A1 | 11/2007 | Taylor |
| 2007/0277036 A1 | 11/2007 | Chamberlain et al. |
| 2008/0024586 A1 | 1/2008 | Barron |
| 2008/0109526 A1 | 5/2008 | Subramanian et al. |
| 2008/0115216 A1 | 5/2008 | Barron et al. |
| 2008/0115217 A1 | 5/2008 | Barron et al. |
| 2008/0126509 A1 | 5/2008 | Subramanian et al. |
| 2008/0147828 A1 | 6/2008 | Enstone et al. |
| 2008/0148400 A1 | 6/2008 | Barron et al. |
| 2008/0177890 A1 | 7/2008 | Krause et al. |
| 2008/0181245 A1 | 7/2008 | Basso et al. |
| 2008/0240103 A1 | 10/2008 | Schmidt |
| 2008/0240111 A1 | 10/2008 | Gadelrab |
| 2008/0244060 A1 | 10/2008 | Cripe et al. |
| 2008/0301406 A1 | 12/2008 | Jacobson et al. |
| 2008/0304519 A1 | 12/2008 | Koenen et al. |
| 2009/0016217 A1 | 1/2009 | Kashyap |
| 2009/0060197 A1 | 3/2009 | Taylor et al. |
| 2009/0089475 A1 | 4/2009 | Chitlur et al. |
| 2009/0165003 A1 | 6/2009 | Jacobson et al. |
| 2009/0182683 A1 | 7/2009 | Taylor et al. |
| 2009/0201926 A1 | 8/2009 | Kagan et al. |
| 2009/0213856 A1 | 8/2009 | Paatela et al. |
| 2009/0268612 A1 | 10/2009 | Felderman et al. |
| 2009/0287628 A1 | 11/2009 | Indeck et al. |
| 2009/0302923 A1 | 12/2009 | Smeloy et al. |
| 2010/0070677 A1 | 3/2010 | Thakkar |
| 2010/0088437 A1 | 4/2010 | Zahavi |
| 2010/0138840 A1 | 6/2010 | Kagan et al. |
| 2010/0169880 A1 | 7/2010 | Haviv et al. |
| 2010/0188140 A1 | 7/2010 | Smeloy |
| 2010/0189206 A1 | 7/2010 | Kagan |
| 2010/0198850 A1 | 8/2010 | Cytron et al. |
| 2010/0265849 A1 | 10/2010 | Harel |
| 2010/0274876 A1 | 10/2010 | Kagan et al. |
| 2011/0004457 A1 | 1/2011 | Haviv et al. |
| 2011/0010557 A1 | 1/2011 | Kagan et al. |
| 2011/0029669 A1 | 2/2011 | Chuang et al. |
| 2011/0029847 A1 | 2/2011 | Goldenberg et al. |
| 2011/0040701 A1 | 2/2011 | Singla et al. |
| 2011/0044344 A1 | 2/2011 | Hudson et al. |
| 2011/0058571 A1 | 3/2011 | Bloch et al. |
| 2011/0083064 A1 | 4/2011 | Kagan et al. |
| 2011/0096668 A1 | 4/2011 | Bloch et al. |
| 2011/0113083 A1 | 5/2011 | Shahar |
| 2011/0116512 A1 | 5/2011 | Crupnicoff et al. |
| 2011/0119673 A1 | 5/2011 | Bloch et al. |
| 2011/0161777 A1 | 6/2011 | Radulescu |
| 2011/0173352 A1 | 7/2011 | Sela et al. |
| 2011/0173399 A1 | 7/2011 | Chen et al. |
| 2011/0178917 A1 | 7/2011 | Parsons et al. |
| 2011/0178918 A1 | 7/2011 | Parsons et al. |
| 2011/0178919 A1 | 7/2011 | Parsons et al. |
| 2011/0178957 A1 | 7/2011 | Parsons et al. |
| 2011/0184844 A1 | 7/2011 | Parsons et al. |
| 2011/0302481 A1 | 12/2011 | Calvignac et al. |
| 2012/0089496 A1 | 4/2012 | Taylor et al. |
| 2012/0089497 A1 | 4/2012 | Taylor et al. |
| 2012/0095893 A1 | 4/2012 | Taylor et al. |
| 2012/0246052 A1 | 9/2012 | Taylor et al. |
| 2013/0000700 A1 | 1/2013 | Lee |
| 2013/0031268 A1 | 1/2013 | Pope et al. |
| 2013/0103777 A1* | 4/2013 | Kagan .................. H04L 49/358 709/212 |
| 2013/0246552 A1* | 9/2013 | Underwood ............ H04L 1/12 709/212 |
| 2013/0279378 A1* | 10/2013 | Niea ........................ H04B 3/36 370/293 |
| 2014/0036928 A1 | 2/2014 | Roy |
| 2014/0112346 A1 | 4/2014 | Tamir et al. |
| 2014/0280716 A1 | 9/2014 | Arramreddy et al. |
| 2014/0281056 A1 | 9/2014 | Davda et al. |
| 2015/0127763 A1 | 5/2015 | Pope et al. |
| 2016/0224443 A1 | 8/2016 | Kuba |
| 2019/0370215 A1 | 12/2019 | Pope et al. |

FOREIGN PATENT DOCUMENTS

| | | |
|---|---|---|
| WO | 2002035838 A1 | 5/2002 |
| WO | 2008127672 A2 | 10/2008 |
| WO | 2009134219 A1 | 11/2009 |
| WO | 2009136933 A1 | 11/2009 |
| WO | 2010020907 A2 | 2/2010 |
| WO | 2010087826 A1 | 8/2010 |
| WO | 2011043769 A1 | 4/2011 |
| WO | 2011053305 A1 | 5/2011 |
| WO | 2011053330 A1 | 5/2011 |
| WO | 2013048409 A1 | 4/2013 |

OTHER PUBLICATIONS

Raj K. Singh, et al.; "A Programmable HIPPI Interface for a Graphics Supercomputer," Proceedings of the 1993 ACM/IEEE conference on Supercomputing, pp. 124-132, Portland, Oregon; Nov. 15, 1993.

Peter Druschel and Larry L. Peterson; "Fbufs: A High-Bandwidth Cross-Domain Transfer Facility," ACM Operating Systems Review, vol. 27, Issue 5, pp. 189-202, Dec. 1993.

Matthias Kaiserswerth; "The Parallel Protocol Engine," IEEE/ACM Transactions in Networking vol. 1, Issue 6, pp. 650-663, Dec. 1993.

Chris Maeda, Brian Bershad; "Protocol Service Decomposition for High-Performance Networking," ACM Operating Systems Review, vol. 27, Issue 5, 12 pages, Dec. 1993.

Greg Regnier, et al.; ETA: Experience with an Intel Xeon Processor as a Packet Processing EngineIEEE Micro, vol. 24, No. 1, pp. 24-31, Jan. 1994.

J. Vis; "A Simple LAN Performance Measure," ACM Computer Communication Review, vol. 24, No. 1, pp. 7-11, Jan. 1994.

Danny Cohen, Gregory Finn, Robert Felderman, Annette DeSchon; "ATOMIC: A High-Speed Local Communication Architecture," Journal of High Speed Networks; pp. 1-11, Jan. 3, 1994.

Gregory G. Finn and Paul Mockapetris; "Netstation Architecture Multi-Gigabit Workstation Network Fabric," Proceedings of InterOp '94, Las Vegas, Nevada; pp. 1-9, May 1994.

Stuart Wray, et al.; "The Medusa Applications Environment," Proceedings of the International Conference on Multimedia Computing and Systems, Boston, MA, 9 pages, May 1994.

Various forum members; "MPI: A Message-Passing Interface Standard," Message-Passing Interface Forum, University of Tennessee, Knoxville, 236 pages, May 5, 1994.

Raj K. Singh, et al.; "A Programmable Network Interface for a Message-Based Multicomputer," ACM Computer Communication Review, vol. 24, No. 3, pp. 8-17, Jul. 1994.

P. Druschel, et al.; "Experiences with a High-Speed Network Adaptor: A Software Perspective," ACM Computer Communication Review, vol. 24, No. 4, pp. 2-13, Oct. 1994.

Sally Floyd; "TCP and Explicit Congestion Notification," ACM Computer Communication Review, vol. 24, No. 5, p. 8-23, Oct. 1994.

A. Edwards, et al.; "User-Space Protocols Deliver High Performance to Applications on a Low-Cost Gb/s LAN," ACM Computer Communication Review, vol. 24, No. 4, pp. 14-23, Oct. 1994.

L. S. Brakmo, et al.; "TCP Vegas: New Techniques for Congestion Detection and Avoidance," ACM Computer Communication Review, vol. 24, No. 4, pp. 24-35, Oct. 1994.

A. Romanow and S. Floyd; "The Dynamics of TCP Traffic over ATM Networks," ACM Computer Communication Review, vol. 24, No. 4, pp. 79-88, Oct. 1994.

R. J. Black, I. Leslie, and D. McAuley; "Experiences of Building an ATM Switch for the Local Area," ACM Computer Communication Review, vol. 24, No. 4, pp. 158-167, Oct. 1994.

(56) References Cited

OTHER PUBLICATIONS

Babak Falsafi, et al.; "Application-Specific Protocols for User-Level Shared Memory," Proceedings of the 1994 conference on Supercomputing, pp. 380-389, Washington D.C.; Nov. 14, 1994.
Mengjou Lin, et al.; "Performance of High-Speed Network I/O Subsystems: Case Study of a Fibre Channel Network," Proceedings of the 1994 conference on Supercomputing, Washington D.C.; pp. 174-183, Nov. 14, 1994.
Nanette J. Boden, et al.; "Myrinet: A Gigabit-per-Second Local-Area Network," Draft of paper published in IEEE Micro, vol. 15, No. 1, pp. 1-15, Nov. 16, 1994.
Thomas Sterling, et al.; "Beowolf: A Parallel Workstation for Scientific Computation," Proceedings of the 24th International Conference on Parallel Processing, pp. 1-4, Aug. 1995.
K. Kleinpaste, P. Steenkiste, B. Zill; "Software Support for Outboard Buffering and Checksumming," ACM Computer Communication Review, vol. 25, No. 4, pp. 87-98, Oct. 1995.
C. Partridge, J. Hughes, J. Stone; "Performance of Checksums and CRCS over Real Data," ACM Computer Communication Review, vol. 25, No. 4, pp. 68-76, Oct. 1995.
Edwards, et al., "Experiences Implementing a High-Performance TCP in User-Space," ACM Computer Communication Review, vol. 25, No. 4, pp. 196-205, Oct. 1995.
J. C. Mogul; "The Case for Persistent-Connection HTTP," ACM Computer Communication Review, vol. 25, No. 4, pp. 299-313, Oct. 1995.
Thorsten von Eicken, et al.; "U-Net: A User-Level Network Interface for Parallel and Distributed Computing," ACM Operating Systems Review, vol. 29, Issue 5, pp. 40-53, Dec. 1995.
D. L. Tennenhouse, D. J. Wetherall; "Towards an Active Network Architecture," ACM Computer Communication Review, vol. 26, No. 2, pp. 5-18, Apr. 1996.
Paul Ronald Barham; "Devices in a Multi-Service Operating System," PhD Thesis, University of Cambridge, 142 pages, Jul. 1996.
Chi-Chao Chang, et al.; "Low-Latency Communication on the IBM RISC System/6000 SP," Proceedings of the 1996 ACM/IEEE conference on Supercomputing, Pittsburgh, pp. 1-17, Nov. 17, 1996.
Joe Touch, et al.; "Experiences with a Production Gigabit LAN," Gigabit Networking Workshop '97 Meeting, Kobe, Japan, 10 pages, Apr. 1997.
Joe Touch, et al.; "Host-based Routing Using Peer DMA," Gigabit Networking Workshop '97 Meeting, Kobe, Japan, 2 pages, Apr. 1997.
O. Angin, et al.; "Report on the 5th IFIP Internation Workshop on Quality of Service (IWQOS 97)," ACM Computer Communication Review, vol. 27, No. 3, pp. 100-117, Jul. 1997.
Charles P. Thacker and Lawrence C. Stewart; "Firefly: a Multiprocessor Workstation," ACM Operating Systems Review, vol. 21, Issue 4, pp. 164-172, Oct. 1987.
Ed Anderson, et al.; "Performance of the CRAY T3E Multiprocessor," Proceedings of the 1997 ACM/IEEE conference on Supercomputing, pp. 1-17, San Jose, California; Nov. 16, 1997.
Harvey J. Wassermann, et al.; "Performance Evaluation of the SGI Origin2000: A Memory-Centric Characterization of LANL ASCI Applications," Proceedings of the 1997 ACM/IEEE conference on Supercomputing, pp. 1-11, San Jose, California; Nov. 16, 1997.
Philip Buonadonna, et al.; "An Implementation and Analysis of the Virtual Interface Architecture," Proceedings of the 1998 ACM/IEEE conference on Supercomputing, Orlando, Florida, 20 pages, Nov. 7, 1998.
Parry Husbands and James C. Hoe; "MPI-StarT: Delivering Network Performance to Numerical Applications," Proceedings of the 1998 ACM/IEEE conference on Supercomputing, Orlando, Florida, 15 pages, Nov. 7, 1998.
Michael S. Warren, et al.; "Avalon: An Alpha/Linux Cluster Achieves 10 Gflops for $150k," Proceedings of the 1998 ACM/IEEE conference on Supercomputing, Orlando, Florida, pp. 1-10, Nov. 7, 1998.
John Salmon, et al.; "Scaling of Beowulf-class Distributed Systems," Proceedings of the 1998 ACM/IEEE Conference on Supercomputing, Orlando, Florida, pp. 1-18, Nov. 7, 1998.

Boon S. Ang, et al.; "StarT-Voyager: A Flexible Platform for Exploring Scalable SMP Issues," Proceedings of the 1998 ACM/IEEE conference on Supercomputing, Orlando, Florida, 19 pages, Nov. 7, 1998.
S. L. Pope, et al.; "Enhancing Distributed Systems with Low-Latency Networking," Parallel and Distributed Computing and Networks, Brisbane, Australia, pp. 1-12, Dec. 1998.
M. de Vivo, et al.; "Internet Vulnerabilities Related to TCP/IP and T/TCP," ACM Computer Communication Review, vol. 29, No. 1, pp. 81-85, Jan. 1999.
M. Allman; "TCP Byte Counting Refinements," ACM Computer Communication Review, vol. 29, No. 3, pp. 14-22, Jul. 1999.
Steve Muir and Jonathan Smith; "Piglet: A Low-Intrusion Vertical Operating System," Technical Report MS-CIS-00-04, University of Pennsylvania, 2000, pp. 1-15, Jan. 2000.
Patrick Crowley, et al.; "Characterizing Processor Architectures for Programmable Network Interfaces," Proceedings of the 14th international conference on Supercomputing, Santa Fe, New Mexico, 12 pages, May 8, 2000.
Jonathan Stone, Craig Partridge; "When the CRC and TCP Checksum Disagree," ACM Computer Communication Review, vol. 30, No. 4, 11 pages, Oct. 2000.
W. Feng and P. Tinnakornsrisuphap; "The Failure of TCP in High-Performance Computational Grids," Proceedings of the 2000 ACM/IEEE conference on Supercomputing, Dallas, Texas, 11 pages, Nov. 4, 2000.
Jenwei Hsieh, et al.; "Architectural and Performance Evaluation of GigaNet and Myrinet Interconnects on Clusters of Small-Scale SMP Servers," Proceedings of the 2000 ACM/IEEE conference on Supercomputing, Dallas, Texas, pp. 1-9, Nov. 4, 2000.
Ian Pratt and Keir Fraser; "Arsenic: A User-Accessible Gigabit Ethernet Interface," Proceedings of IEEE Infocom 2001, pp. 1-11; Apr. 22, 2001.
Gordon E. Moore; "Cramming more components onto integrated circuits," Electronics, vol. 38, No. 8, 4 pages, Apr. 1, 1965.
Jack B. Dennis and Earl C. Van Horn; "Programming Semantics for Multiprogrammed Computations," Communications of the ACM, vol. 9, No. 3, pp. 143-155, Mar. 1966.
Marvin Zelkowitz; "Interrupt Driven Programming," Communications of the ACM, vol. 14, No. 6, p. 417-418, Jun. 1971.
J. Carver Hill; "Synchronizing Processors with Memory-Content-Generated Interrupts," Communications of the ACM, vol. 16, No. 6, p. 350-351, Jun. 1973.
F.F. Kuo; "The Aloha System," ACM Computer Communication Review, vol. 4, No. 1, pp. 5-8, Jan. 1974.
Vinton Cerf, Robert Kahn; "A Protocol for Packet Network Intercommunication," IEEE Transactions on Communications, vol. COM-22, No. 5, 13 pages, May 1974.
V. Cerf, et al.; "Proposal for an International End-to-End Protocol," ACM Computer Communication Review, vol. 6 No. 1, pp. 63-89, Jan. 1976.
Robert M. Metcalfe and David R. Boggs; "Ethernet: distributed packet switching for local computer networks," Communications of the ACM, vol. 19, Issue 7, pp. 395-404, Jul. 1976.
P. Kermani and L. Kleinrock; "Virtual cut-through: A new computer communciation switching technique," Computer Networks, vol. 3, No. 4, pp. 267-286, Sep. 1979.
John M. McQuillan, et al.; "An Overview of the New Routing Algorithm for the ARPANET," Proceedings of the 6th Data Communications Symposium, pp. 54-60, Nov. 1979.
Andrew D. Birrell, et al.; "Grapevine: An Exercise in Distributed Computing," Communications of the ACM, vol. 25, Issue 4, pp. 260-274, Apr. 1982.
Ian M. Leslie, et al.; "The Architecture of the Universe Network," ACM Computer Communication Review, vol. 14, No. 2, pp. 2-9, Jun. 1984.
John Nagle; "Congestion Control in IP/TCP Internetworks," ACM Computer Communication Review, vol. 14, No. 4, p. 11-17, Oct. 1984.
Robert M. Brandriff, et al.; "Development of a TCP/IP for the IBM/370," ACM Computer Communication Review, vol. 15, No. 4, pp. 2-8, Sep. 1985.

(56) References Cited

OTHER PUBLICATIONS

C. Kline; "Supercomputers on the Internet: A Case Study," ACM Computer Communication Review, vol. 17, No. 5, pp. 27-33, Aug. 1987.
Christopher A. Kent, Jeffrey C. Mogul; "Fragmentation Considered Harmful," ACM Computer Communication Review, vol. 17, No. 5, pp. 75-87, Oct. 1987.
Gary S. Delp, et al.; "An Analysis of Memnet: An Experiment in High-Speed Shared-Memory Local Networking," ACM Computer Communication Review, vol. 18, No. 4, p. 165-174, Aug. 1988.
David R. Boggs, et al.; "Measured Capacity of an Ethernet: Myths and Reality," ACM Computer Communication Review, vol. 18, No. 4, pp. 222-234, Aug. 1988.
H. Kanakia and D. Cheriton; "The VMP Network Adapter Board (NAB): High-Performance Network Communication for Multiprocessors," ACM Computer Communication Review, vol. 18, No. 4, pp. 175-187, Aug. 1988.
V. Jacobson; "Congestion Avoidance and Control," ACM Computer Communication Review, vol. 18, No. 4, pp. 157-173, Aug. 1988.
David D. Clark; "The Design Philosophy of the DARPA Internet Protocols," ACM Computer Communication Review, vol. 18, No. 4, pp. 102-111, Aug. 1988.
Paul V. Mockapetris, Kevin J. Dunlap; "Development of the Domain Name System," ACM Computer Communication Review, vol. 18, No. 4, pp. 112-122, Aug. 1988.
Margaret L. Simmons and Harvey J. Wasserman; "Performance Comparison of the Cray-2 and Cray X-MP/416 Supercomputers," Proceedings of the 1988 ACM/IEEE conference on Supercomputing, pp. 288-295, Orlando, Florida; Nov. 12, 1988.
David A. Borman; "Implementing TCP/IP on a Cray computer," ACM Computer Communication Review, vol. 19, No. 2, pp. 11-15, Apr. 1989.
R. Braden, et al.; "Computing the Internet Checksum," ACM Computer Communication Review, vol. 19, No. 2, pp. 86-94, Apr. 1989.
David D. Clark, et al.; "An Analysis of TCP Processing Overhead," IEEE Communications Magazine, vol. 27, No. 6, pp. 23-29, Jun. 1989.
David R. Cheriton; "Sirpent: A High-Performance Internetworking Approach," ACM Computer Communication Review, vol. 19, No. 4, pp. 158-169, Sep. 1989.
Derek Robert McAuley; "Protocol Design for High Speed Networks," PhD Thesis, University of Cambridge, 104 pages, Sep. 1989.
Craig Partridge; "How Slow is One Gigabit Per Second?," ACM Computer Communication Review, vol. 20, No. 1, pp. 44-53, Jan. 1990.
D. D. Clark and D. L. Tennenhouse; "Architectural Considerations for a New Generation of Protocols," ACM Computer Communication Review, vol. 20, No. 4, pp. 200-208, Sep. 1990.
Eric C. Cooper, et al.; "Protocol Implementation on the Nectar Communication Processor," ACM Computer Communication Review, vol. 20, No. 4, 10 pages, Sep. 1990.
Bruce S. Davie; "A Host-Network Interface Architecture for ATM," ACM Computer Communication Review, vol. 21, No. 4, pp. 307-315, Sep. 1991.
C. Brendan S. Traw, et al.; "A High-Performance Host Interface for ATM Networks," ACM Computer Communication Review, vol. 21, No. 4, pp. 317-325, Sep. 1991.
Ian Leslie and Derek R. McAuley; "Fairisle: An ATM Network for the Local Area," ACM Computer Communication Review, vol. 21, No. 4, pp. 327-336, Sep. 1991.
Mark Hayter, Derek McAuley; "The Desk Area Network," ACM Operating Systems Review, vol. 25, Issue 4, pp. 1-11, Oct. 1991.
Gregory G. Finn; "An Integration of Network Communication with Workstation Architecture," ACM Computer Communication Review, vol. 21, No. 5, 12 pages, Oct. 1991.
Chesson, "The Evolution of XTP," Proceedings of the Third International Conference on High Speed Networking, 1991, Nov. 1991, 10 pp.

Michael J. Dixon; "System support for multi-service traffic," University of Cambridge Computer Laboratory Technical Report, No. 245, pp. 1-108, Jan. 1992.
Danny Cohen, Gregory Finn, Robert Felderman, Annette DeSchon; "ATOMIC: A Local Communication Network Created Through Repeated Application of Multicomputing Components," Provided by Authors, pp. 1-21, Jan. 10, 1992.
Gene Tsudik; "Message Authentication with One-Way Hash Functions," ACM Computer Communication Review, vol. 22, No. 5, pp. 29-38, Oct. 1992.
Peter Steenkiste; "Analyzing Communication Latency using the Nectar Communication Processor," ACM Computer Communication Review, vol. 22, No. 4, pp. 199-209, Oct. 1992.
Paul E. McKenney and Ken F. Dove; "Efficient Demultiplexing of Incoming TCP Packets," ACM Computer Communication Review, vol. 22, No. 4, pp. 269-279, Oct. 1992.
Erich Ruetsche and Matthias Kaiserswerth; "TCP/IP on the Parallel Protocol Engine," Proceedings of the IFIP TC6/WG6.4 Fourth International Conference on High Performance Networking IV; pp. 119-134. Dec. 14, 1992.
C. Traw and J. Smith; "Hardware/Software organization of a high performance ATM host interface," IEEE Journal on Selected Areas in Communications, pp. 1-22, Feb. 1993.
E. Ruetsche; "The Architecture of Gb/s Multimedia Protocol Adapter," ACM Computer Communication Review, vol. 23, No. 3, pp. 59-68, Jul. 1993.
Jonathan M. Smith and C. Brendan S. Traw; "Giving Applications Access to Gb/s Networking," IEEE Network, vol. 7, Issue 4, 14 pages, Jul. 1993.
Jeffrey R. Michel; "The Design and Evaluation of an Off-Host Communications Protocol Architecture," MSci Thesis, University of Virginia, 144 pages, Aug. 1993.
Mark David Hayter; "A Workstation Architecture to Support Multimedia," PhD Thesis, University of Cambridge, 111 pages, Sep. 1993.
Jonathan Kay and Joseph Pasquale; "The Importance of Non-Data Touching Processing Overheads in TCP/IP," ACM Computer Communication Review, vol. 23, No. 4, 10 pages, Oct. 1993.
W. E. Leland, et al.; "On the Self-Similar Nature of Ethernet Traffic," ACM Computer Communication Review, vol. 23, No. 4, pp. 183-193, Oct. 1993.
Hrvoye, Bilic, et al.; article in Proceedings of the 9th Symposium on High Performance Interconnects, "Deferred Segmentation for Wire-Speed Transmission of Large TCP Frames over Standard GbE Networks," Aug. 22, 2001, 5pp.
Bilic Hrvoye, et al.; "Presentation given at HOTI'01," 9th Symposium on High Performance Interconnects, 9 pages, Aug. 22, 2001.
Lowekamp, Bruce, et al., "Topology discovery for large ethernet networks," ACM SIGCOMM Computer Communication Review— Proc. 2001 SIGCOMM conf., vol. 31, No. 4, 2001, Oct. 2001, pp. 237-248.
Shivam, P., et al., "EMP: Zero-copy OS-bypass NIC-driven Gigabit Ethernet Message Passing," Proc. 2001 ACM/IEEE Conf. on Supercomputing, Denver, Nov. 10, 2001, 8 pages.
Ross, Robert, et al., "A Case Study in Application I/O on Linux Clusters," Proc. 2001 ACM/IEEE Conf. on Supercomputing, Denver, Nov. 10, 2001, 17pp.
Blanton, E. and Allman, M., "On Making TCP More Robust to Packet Reordering," ACM Computer Communication Review, vol. 32, No. 1, 2002, Jan. 2002, pp. 20-30.
Rangarajan, Murali, et al., "TCP Servers: Offloading TCP Processing in Internet Servers. Design, Implementation, and Performance," Technical Report DCR-TR-481, Computer Science Department, Rutgers University, 2002, Mar. 2002, 14 pp.
Crowcroft, Jon and McAuley, Derek, "ATM: A Retrospective on Systems Legacy or 'A technology with a fabulous future behind it?'", ACM Computer Communication Review, vol. 32, No. 5, 2002, Nov. 2002, pp. 11-12.
Charles Kalmanek; "A Retrospective View of ATM," ACM Computer Communication Review, vol. 32, No. 5, pp. 13-19, Nov. 2002.
Smith, Jonathan, ACM Computer Communication Review, vol. 32, No. 5, pp. 29-37, 2002, Nov. 2002.

(56) References Cited

OTHER PUBLICATIONS

Adiga, NR, et al., "An Overview of the BlueGene/L Supercomputer," Proceedings of the 2002 ACM/IEEE conference on Supercomputing, Baltimore, Nov. 16, 2002, pp. 1-22.
Steven J. Sistare, Christopher J. Jackson; "Ultra-High Performance Communication with MPI and the Sun Fire Link Interconnect," Proceedings of the 2002 ACM/IEEE conference on Supercomputing, p. 1-15, Baltimore; Nov. 16, 2002.
Bush, R. Bush and Meyer, D., IETF Network Working Group, Request for Comments memo: 3439 [extending RFC1958], Dec. 2002, Some Internet Architectural Guidelines and Philosophy, 25 pp, The Internet Society (c)2002.
Sarolahti, Pasi, et al., "F-RTO: an enhanced recovery algorithm for TCP retransmission timeouts," ACM Computer Communication Review, vol. 33, No. 2, 2003, Apr. 2003, pp. 51-63.
Tom Kelly; "Scalable TCP: Improving Performance in Highspeed Wide Area Networks," ACM Computer Communication Review, vol. 33, No. 2, pp. 83-91, Apr. 2003.
Jeffrey C. Mogul; "TCP offload is a dumb idea whose time has come," Proceedings of HotOS IX: The 9th Workshop on Hot Topics in Operating Systems, pp. 26-30, May 18, 2003.
McAuley, Derek and Neugebauer, Rolf, "A case for virtual channel processors," NICELI '03 Proc.of the ACM SIGCOMM workshop, Aug. 2003, pp. 237-242.
Hurwitz, Justin and Feng, Wu-chun, "Initial end-to-end performance evaluation of 10-Gigabit Ethernet," Proc. 11th Symposium on High Performance Interconnects, Aug. 20, 2003, pp. 116-121.
Vinay Aggarwal, et al.; "Workshop on network—I/O convergence: experience, lessons, implications (NICELI)," ACM Computer Communication Review, vol. 33, No. 5, pp. 75-80, Oct. 2003.
Wu-chun Feng, et al.; "Optimizing 10-Gigabit Ethernet for Networks ofWorkstations, Clusters, and Grids: A Case Study," Proceedings of the 2003 ACM/IEEE conference on Supercomputing, Phoenix, Arizona, 13 pages, Nov. 15, 2003.
Liu, Jiuxing, et al., "Performance Comparison of MPI Implementations over InfiniBand, Myrinet and Quadrics," Proc. 2003 ACM/IEEE conference on Supercomputing, Phoenix, Arizona, Nov. 15, 2003, 14 pp (58-71).
Srihari Makineni and Ravi Iyer; "Architectural Characterization of TCP/IP Packet Processing on the Pentium M Processor," Proceedings of the 10th International Symposium on High Performance Computer Architecture, 11 pages, Feb. 14, 2004.
Cheng Jin, et al.; "FAST TCP: Motivation, Architecture, Algorithms, Performance," Proceedings of IEEE Infocom 2004, 21 pages, Mar. 7, 2004.
Currid, Andy, "TCP Offload to the Rescue," ACM Queue, vol. 2, No. 3, 2004, May 1, 2004, pp. 58-65.
Greg Regnier, et al.; "TCP Onloading for Data Center Servers," Computer, IEEE Computer Society, vol. 37, No. 11, pp. 48-58, Nov. 2004.
Gregory L. Chesson; "Declaration of Dr Gregory L Chesson in *Alacritech* v. *Microsoft*," United States District Court, Northern District California, San Francisco Division, 289 pages, Feb. 4, 2005.
Lazowska, Edward D. and Patterson, David A., "Computing Research: A Looming Crisis," ACM Computer Communication Review, vol. 35, No. 2, 2005, Jul. 2005, pp. 65-68.
W. Feng, et al.; "Performance Characterization of a 10-Gigabit Ethernet TOE," Proceedings of the 13th Symposium on High Performance Interconnects, pp. 1-6, Aug. 17, 2005.
Leslie, B., et al., "User-level Device Drivers: Achieved Performance," J. Comput. Sci. & Technol., vol. 20, Sep. 2005, Sep. 2005, 17pp.
Balaji, P., et al., "Head-to TOE Evaluation of High-Performance Sockets over Protocol Offload Entines," Proceedings of the IEEE International Conference on Cluster Computing, 2005, Sep. 2005, 10pp.
Humaira Kamal, et al.; "SCTP versus TCP for MPI," Proceedings of the 2005 ACM/IEEE conference on Supercomputing, Seattle, Washington, 14 pages, Nov. 12, 2005.
Bhandarkar, Sumitha, et al., "LTCP: Improving the Permormance of TCP in Highspeed Networks," ACM Computer Communication Review, vol. 36, No. 1, 2006, Jan. 2006, pp. 41-50.
H. K. Jerry Chu; "Zero-Copy TCP in Solaris," Proceedings of the USENIX Annual Technical Conference, 13 pages, Jan. 1996.
Ken Calvert; "Reflections on Network Architecture: an Active Networking Perspective," ACM Computer Communication Review, vol. 36, No. 2, pp. 27-30, Apr. 2006.
Jon Crowcroft; "10 Networking Papers: Recommended Reading," ACM Computer Communication Review, vol. 36, No. 2, pp. 31-32, Apr. 2006.
Greg Minshall, et al.; "Flow labelled IP over ATM: design and rationale," ACM Computer Communication Review, vol. 36, No. 3, pp. 79-92, Jul. 2006.
David Wetherall; "10 Networking Papers: Readings for Protocol Design," ACM Computer Communication Review, vol. 36, No. 3, pp. 77-78, Jul. 2006.
Patrick Geoffray; "A Critique of RDMA," HPCWire article: http://www.hpcwire.com/features/17886984.html, 7 pages, Aug. 18, 2006.
Jose Carlos Sancho, et al.; "Quantifying the Potential Benefit of Overlapping Communication and Computation in Large-Scale Scientific Applications," Proceedings of the 2006 ACM/IEEE conference on Supercomputing, Tampa, Florida, 40 pages, Nov. 11, 2006.
Sayantan Sur, et al.; "High-Performance and Scalable MPI over InfiniBand with Reduced Memory Usage: An In-Depth Performance Analysis," Proceedings of the 2006 ACM/IEEE conference on Supercomputing, Tampa, Florida, 13 pages, Nov. 11, 2006.
Steven Pope, David Riddoch; "10Gb/s Ethernet Performance and Retrospective," ACM Computer Communication Review, vol. 37, No. 2, pp. 89-92, Mar. 19, 2007.
Kieran Mansley, et al.; "Getting 10 Gb/s from Xen," Euro-Par Conference 2007, Rennes, France, 10 pages, Aug. 28, 2007.
M. Kaiserswerth; "The Parallel Protocol Engine," IEEE/ACM Transactions in Networking vol. 1, Issue 6, pp. 650-663, Dec. 1993.
Danny Cohen, et al.; "Use of message-based multicomputer components to construct gigabit networks," ACM Computer Communication Review, vol. 23, No. 4, p. 32-44, Jul. 1993.
J. Evans and T. Buller; "The End of History," IEEE TCGN Gigabit Networking Workshop, 10 pages, Apr. 22, 2001.
M.V. Wilkes and R.M. Needham; "The Cambridge Model Distributed System," ACM SIGOPS Operating Systems Review, vol. 14, Issue 1, pp. 21-29, Jan. 1980.
Geoffray, P., "Protocol Off-Loading vs On-Loading in High-Perfomance Networks," Hot Interconnects 2006, 14th Symposium on High Performance Interconnects, Aug. 23, 2006, 5 pages.
Dickman, "Protocol OffLoading vs OnLoading in High Performance Networks," 14th Symposium on High Performance Interconnects, Aug. 23, 2006, 8pp.
Petrini, F., "Protocol Off-Loading vs On-Loading in High-Performance Networks," Hot Interconnects 2006, 14th Symposium on High Performance Interconnects, Aug. 23, 2006, 4 pages.
Reginer, G., "Protocol Onload vs. Offload," Hot Interconnects 2006, 14th Symposium on High Performance Interconnects, Aug. 23, 2006, 1 page.
Montry, G., "Open Fabrics Alliance," www.openfabrics.org, Hot Interconnects 2006, 14th Symposium on High Performance Interconnects, Aug. 23, 2006, 8 pages.
EP 14191949.8—Extended European Search Report dated Apr. 15, 2015, 7 pages.
U.S. Appl. No. 14/073,735—Office Action dated Dec. 21, 2015, 70 pages.
U.S. Appl. No. 14/073,735—Final Office Action dated Aug. 12, 2016, 17 pages.
U.S. Appl. No. 14/073,735—Response Office Action dated Dec. 21, 2016 filed Apr. 20, 2016, 9 pages.
U.S. Appl. No. 14/073,735—Response to Final Office Action dated Aug. 12, 2016 filed Dec. 20, 2016, 12 pages.
U.S. Appl. No. 14/073,735—Advisory Action dated Jan. 6, 2017, 3 pages.
U.S. Appl. No. 14/073,735—Office Action dated Aug. 10, 2017, 12 pages.
U.S. Appl. No. 14/073,735—Response to Office Action dated Aug. 10, 2017 filed Nov. 6, 2017, 13 pages.

(56) References Cited

OTHER PUBLICATIONS

U.S. Appl. No. 14/073,735—Final Office Action dated Feb. 7, 2018, 11 pages.
U.S. Appl. No. 14/073,735—Office Action dated Sep. 21, 2018, 14 pages.
U.S. Appl. No. 16/541,070—Office Action dated Oct. 16, 2020, 62 pages.
U.S. Appl. No. 16/541,070—Response to Office Action dated Oct. 16, 2020, filed Jan. 13, 2021, 11 pages.
U.S. Appl. No. 16/541,070—Notice of Allowance dated Feb. 5, 2021, 10 pages.

\* cited by examiner

PROGRAMMED INPUT/OUTPUT MODE

CROSS-REFERENCE TO RELATED APPLICATION

This application is a Continuation of U.S. application Ser. No. 14/073,735, filed Nov. 6, 2013, entitled "PROGRAMMED INPUT/OUTPUT MODE". The above application is incorporated herein in its entirety

BACKGROUND

The present application relates to coupling a host device to a network and in particular but not exclusively to the provision of data transfer from the host device to the network.

SUMMARY

According to a first aspect of the present application, there is provided a data processing system comprising: a host computing device comprising at least one processor; a network interface device arranged to couple the host computing device to a network, the network interface device comprising a buffer for receiving data for transmission from the host computing device; wherein the processor is configured to execute instructions to transfer the data for transmission to the buffer; and the data processing system further comprises: an indicator store configured to store an indication that at least some of the data for transmission has been transferred to the buffer wherein the indication is associated with a descriptor pointing to the buffer.

The buffer may be a scratch pad memory. The data processing system may further comprise one or more further buffers; wherein the buffer and one or more further buffers form a plurality of buffers each associated with an address space of the host computing device.

A descriptor may be configured to point to one of the plurality of buffers. A descriptor may be further configured to identify an offset within the buffer to which transferred data is written. The instructions may comprise register store operations to at least one non-cached input/output memory address. The processor may be configured to execute load/store operations to transfer the data to the buffer. The at least one processor may be configured to transfer the data to the buffer using programmed input/output.

The host computing device may be configured to support an operating system running one or more applications. The host computing device may be configured to support a hypervisor driver context. Each of the one or more applications may comprise one or more user-level processes.

The data to be transmitted may comprise at least part of a data transmission unit. The buffer may be a buffer of a size of one or more data transmission units. The data transmission unit may be a data frame. The buffer may be a template comprising one or more fields. The fields may comprise a header field and a payload field.

The data for transmission may comprise first data and may be transferred in a first data transfer and the data processing system may be configured to transfer one or more further data for transmission in one or more further data transfers. For each of the first and one or more data transfers the indicator may comprise a respective descriptor.

The data processing system may further comprise: a descriptor ring for storing one or more descriptors for one or more data transfers, each descriptor pointing to the respective data transfer in the buffer. The indicator store may be configured to store a descriptor for a first data transfer to the buffer and thereafter indications referencing the descriptor ring for subsequent data transfers to the buffer.

The descriptor ring may be further configured to store a command for the network interface device.

The processor may be configured to execute instructions to transfer the data for transmission to the buffer according to a first mode and the data processing system may be further configured to transfer data according to a second mode. The second mode may comprise a direct memory access mode of data transfer. In the second mode the data processing system may be configured to write a descriptor to the descriptor ring, the descriptor pointing to a buffer of the host processing device in which data for transfer is stored. The descriptor ring may store descriptors in accordance with a first mode and descriptors in accordance with the second mode in an order in which the data transfers associated with the respective descriptors were carried out.

The indication may be a doorbell. The network interface device may be configured to fetch a first descriptor from the indicator store and subsequent descriptors from a descriptor ring. The network interface device may be configured to fetch a descriptor from the descriptor ring in response to an indication in the indicator store.

According to a second aspect, there is provided a method comprising: coupling a host computing device to a network by a network interface device; transferring data from the host computing device to a buffer of the network interface by executing instructions by a processor of the host computing device to transfer the data for transmission; and storing an indication that at least some of the data for transmission has been transferred to the buffer wherein the indication is associated with a descriptor pointing to the buffer.

The buffer and one or more further buffers may form a plurality of buffers and the method may further comprise associating each of the plurality of buffers with an address space of the host computing device. The method may further comprise executing load/store operations to transfer the data to the buffer. The method may further comprise transferring the data to the buffer using programmed input/output.

The method may further comprise supporting by the host computing device an operating system running one or more applications. The method may further comprise supporting by the host computing device a hypervisor driver context. The data for transmission may comprise first data and the method may further comprise transferring the first data in a first data transfer and transferring one or more further data for transmission in one or more further data transfers.

The method may further comprise storing in a descriptor ring one or more descriptors for one or more data transfers, each descriptor pointing to the respective data transfer in the buffer. The method may further comprise storing a descriptor for a first data transfer to the buffer and thereafter storing indications referencing the descriptor ring for subsequent data transfers to the buffer.

The method may further comprise storing a command for the network interface device in a descriptor ring.

The method further comprising executing instructions to transfer the data for transmission to the buffer according to a first mode; and transfer ring data according to a second mode. The method may further comprise writing a descriptor pointing to a buffer of the host processing device in which data for transfer according to the second mode is stored. The method may further comprise storing descriptors in accordance with a first mode and descriptors in accordance with the second mode in an order in which the data transfers associated with the respective descriptors were carried out.

The method may further comprise fetching a first descriptor from the indicator store and fetching subsequent descriptors from a descriptor ring. The method may further comprise fetching a descriptor from the descriptor ring in response to an indication in the indicator store.

According to a third aspect, there is provided an apparatus comprising: at least one processor configured to execute instructions to transfer data for transmission to a buffer of a network interface device; and an indicator store configured to store an indication that at least some of the data for transmission has been transferred to the buffer; wherein the indication is associated with a descriptor pointing to the buffer.

According to a fourth aspect, there is provided a method comprising: executing instructions to transfer data for transmission to a buffer of a network interface device; and storing an indication that at least some of the data for transmission has been transferred to the buffer; wherein the indication is associated with a descriptor pointing to the buffer.

According to a fifth aspect, there is provided an apparatus configured to couple a host computing device to a network, the apparatus comprising: a buffer for receiving data for transmission from the host computing device, the data for transmission being transferred to the network interface by instructions executed by a processor of the host computing device; and an access to an indicator store configured to store an indication that at least some of the data for transmission has been transferred to the buffer wherein the indication is associated with a descriptor pointing to the buffer.

According to a sixth aspect, there is provided a method comprising: coupling a host computing device to a network; receiving data for transmission from the host computing device, the data for transmission being transferred to the network interface by instructions executed by a processor of the host computing device; and accessing an indication that at least some of the data for transmission has been transferred to the buffer; wherein the indication is associated with a descriptor pointing to the buffer.

According to a seventh aspect, there is provided a method comprising: monitoring data being transmitted onto a network; detecting a delay in the transmission of the data; and inserting invalid check data into the data.

The data being transmitting onto the network may be a data transmission unit. A delay in the transmission may be detected when a first part of the data transmission unit has been transmitted onto the network. The method may further comprise inserting invalid check data into a tail of the first part of the data transmission unit.

The data transmission unit may be truncated by transmitting only the first part of the data transmission unit when the delay is detected.

The method may further comprise: storing the first part of the data transmission unit; and retransmitting the data transmission unit when a second part of the data transmission unit is received.

The invalid check data may be invalid checksum data for the data. The check data may be a cyclic redundancy check. The check data may be a frame check sequence checksum.

According to an eighth aspect, there is provided an apparatus comprising: a monitor configured to monitor data being transmitted onto a network and detect a delay in the transmission of the data; and wherein when a delay is detected, the monitor is further configured to insert invalid check data into the data being transmitted.

The data being transmitting onto the network may be a data transmission unit. A delay in the transmission may be detected when a first part of the data transmission unit has been transmitted onto the network. The invalid check data may be inserted into a tail of the first part of the data transmission unit.

The apparatus may further comprise: a memory configured to store the first part of the data transmission unit; wherein the monitor is further configured to retransmit the data transmission unit when a second part of the data transmission unit is received.

DETAILED DESCRIPTION

The following description is presented to enable any person skilled in the art to make and use aspects of the present application, and is provided in the context of a particular application. Various modifications to the disclosed embodiments will be readily apparent to those skilled in the art.

The general principles defined herein may be applied to other embodiments and applications without departing from the spirit and scope of the present application. Thus, the present application is not intended to be limited to the embodiments shown, but is to be accorded the widest scope consistent with the principles and features disclosed herein.

The present application relates to a host computing device and network interface device that together may comprise a data processing system. A host computing device could be any kind of computing device, including for example: a server, a personal computer, a switch, a router, a bridge, a virtualised system (e.g. a virtualised operating system and the applications it supports), and a portable device such as a tablet computer or smartphone.

A network interface device could be any hardware device configured to interface a wired or wireless network to a host computing device. The network interface device could be provided in any manner between a network and host device, including: as one or more peripheral devices (such as a peripheral component interconnect express (PCIe) card) of the host computing device, and/or as an integral part of the host computing device (e.g. a local area network (LAN) on mainboard, or LAN on motherboard (LOM) chipset).

Figure 1:
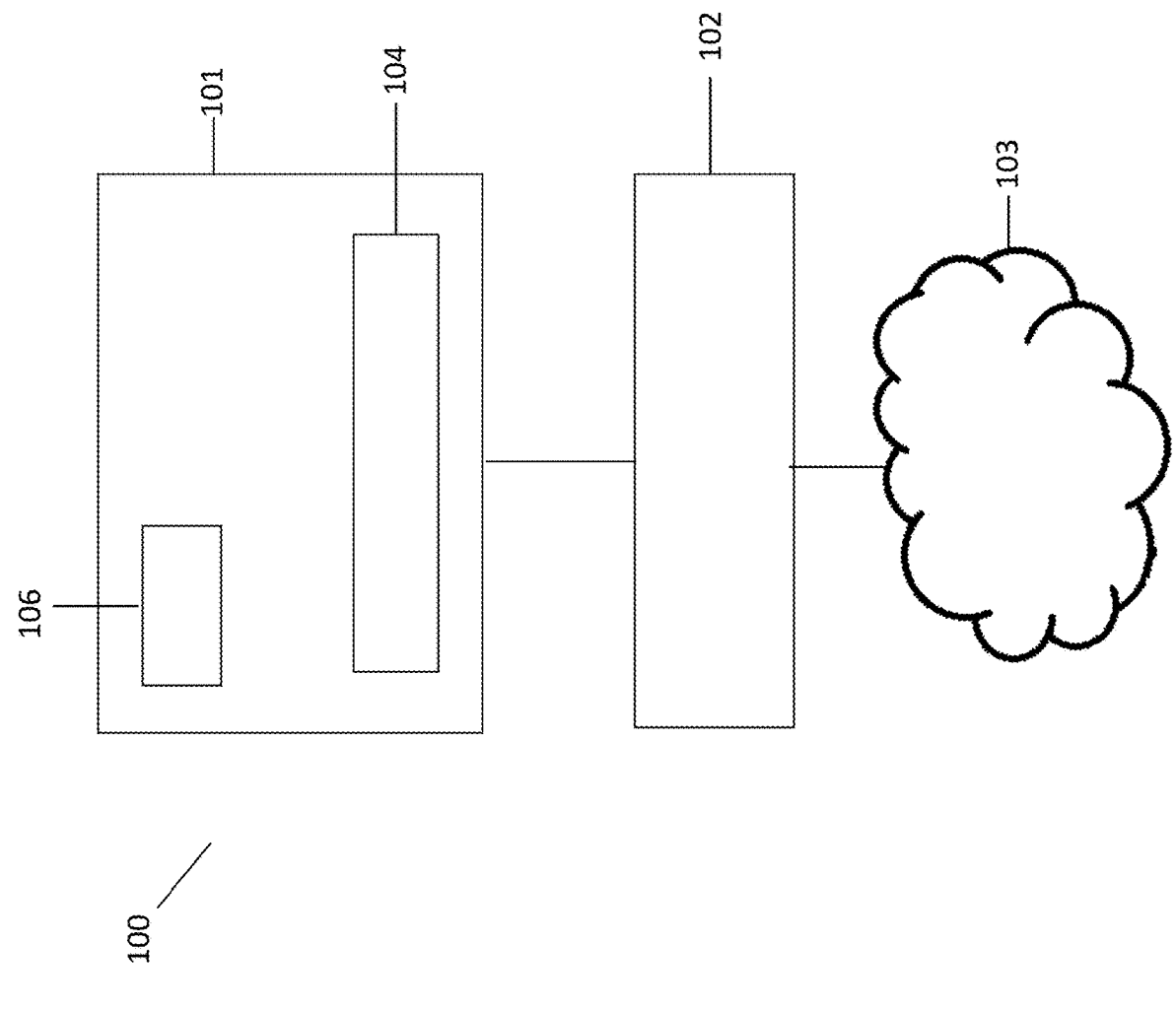
FIG. 1 is a schematic diagram of a data processing system in which embodiments of the present application may be implemented.

A data processing system in which some embodiments may be implemented is shown in FIG. 1. The data processing system 100 comprises a host computing device 101 coupled to a network interface device 102 that is arranged to interface the host to network 103. The host computing device may include an operating system 104 supporting one or more applications 106 and a network protocol stack.

It will be appreciated that the operating system may take various forms, for example the operating system could be a conventional monolithic operating system, a privileged domain (e.g. a hypervisor) supporting one or more virtualised operating systems, or a virtualised operating system itself. In some embodiments, there could therefore be multiple software environments at the host computing device.

The host computing device 101 may comprise one or more central processing units (CPU) and a one or more memories. In some embodiments, the host computing device 101 and the network interface device 102 may communicate via a bus, for example a peripheral component interconnect express (PCIe bus).

During operation of the data processing system, data to be transmitted onto the network may be transferred from the host computing device to the network interface device for transmission.

One method of transferring data for transmission is direct memory access (DMA). In DMA, data in a memory associated with or residing on a host computing device may be transferred to a hardware subsystem, for example a network interface device directly without having to use the CPU of the host computing device. For example a user level process running on the host computing device may generate data to be transmitted over the network. This data to be transmitted may be transferred to the network interface device for transmission using DMA.

Figure 2:
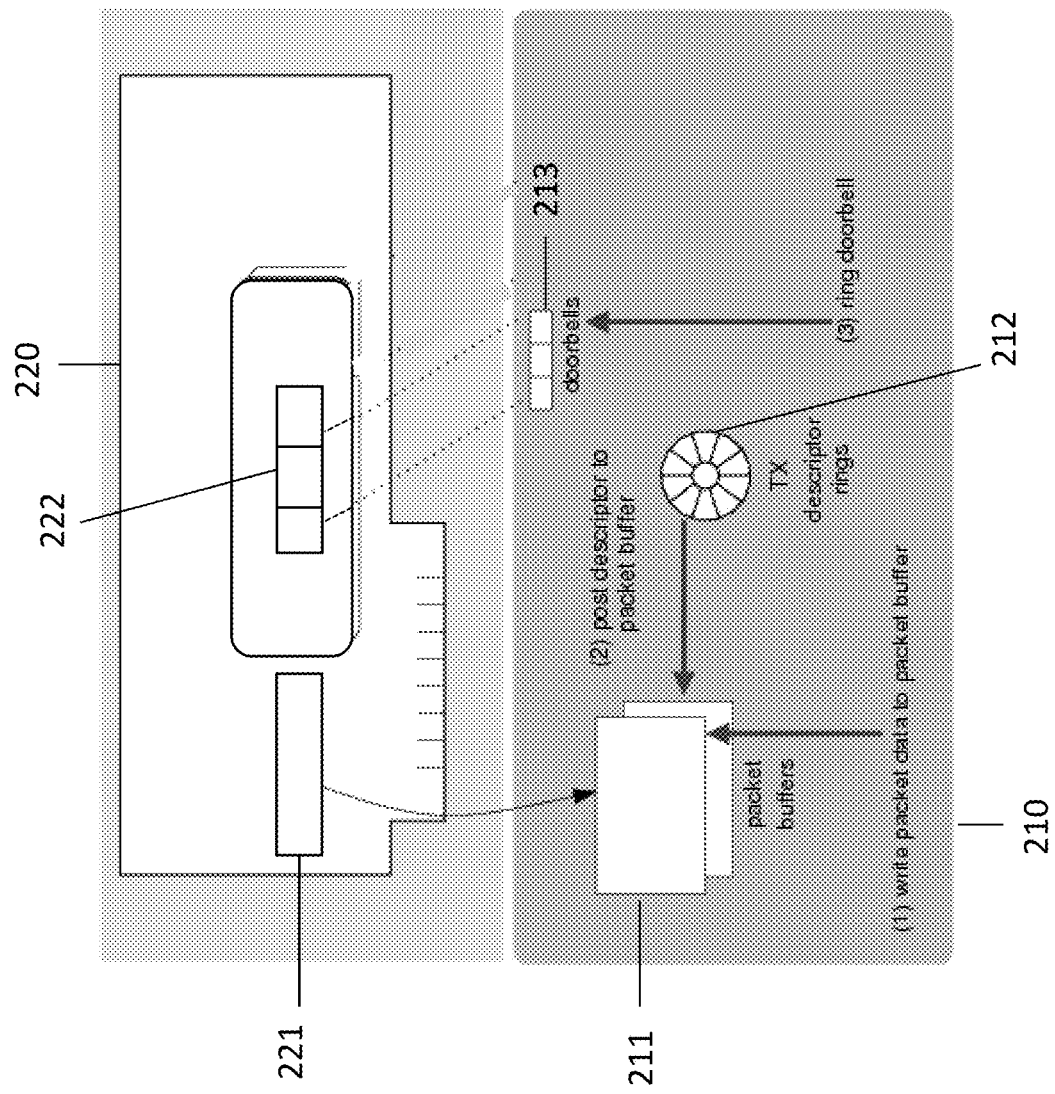
FIG. 2 is a conceptual diagram of a data processing system implementing a direct memory access mode.

FIG. 2 shows an example of a direct memory access mode of operation.

FIG. 2 is a conceptual diagram of a host computing device and a network interface device 220 carrying out DMA. In FIG. 2, a user level process 210 running on the host computing device, may have access to packet buffers 211, transmit descriptor ring 212 and doorbells 213. It will be appreciated that the packet buffer 211, transmit descriptor ring 212 and doorbells 213 may be represented by data structures in a memory. The network interface device 220 may comprise a processing pipeline 221 as well as an access to the doorbells 213.

When a user level process has data to transmit, packets of the data to be transmitted are written to the packet buffers 211. The packet buffers 211 may be mapped to the address space of software operating on the host, for example a user level process, operating system and/or hypervisor driver context, as well as being input/output mapped to the network interface device (for example via an input/output memory management unit (IOMMU) device).

In this manner, the network interface device may access the data packets stored in the packet buffers 211 through the input/output mapping. The construction of data packets in the packet buffers 211 is shown at step 1 in FIG. 2.

At step 2, the user level process writes a descriptor to the descriptor ring 212. The descriptor is a pointer to the packet buffer 211 into which the data to be transmitted has been written. The descriptor ring 212 may be written to with descriptors to indicate that the packet buffer 211 pointed to by the descriptor holds data packets for transmission. The packet buffers 211 may be in a private address space that is accessible to the user level process (for example to write the packet data) and to the network interface.

At step 3 a doorbell is rung. The doorbell is rung by writing a doorbell to the doorbells 213. The user level process writes a doorbell to the doorbells 213 indicating that one or more descriptors are available for reading in the descriptor ring 212. The doorbell may identify the descriptor ring, for example descriptor ring 212, which needs to be serviced. For example this may identify that a descriptor or pointer has been written to the descriptor ring. In some embodiments, the doorbell may comprise further information such as including the first descriptor of the descriptor ring. The inclusion of the first descriptor on the ring may allow the network interface device 220 to use that descriptor without having to pull it from the descriptor ring 212.

In some embodiments, the doorbells are in an area of memory 222 belonging to the network interface device 220 and memory mapped to the address space of the user level process 210. In this example, the user level process writing the doorbells 213 effects a write of the doorbell to a doorbell area of memory 222 of the network interface device. The doorbell may be written through a non-cached memory mapping.

While the foregoing has exemplified memory mapping, it will be appreciated that the network interface 220 may have access to regions of memory holding the packet buffers 211, descriptor ring 212 and doorbells 213.

The network interface device may schedule the descriptor ring and (if necessary) read the relevant descriptors in response to the doorbell. For example, if the doorbell does not include the first descriptor, the network interface device will read the descriptor ring. However, if the doorbell does include the first descriptor, the network interface device may not read the descriptor ring.

When the network interface device has accessed the descriptor (by reading the descriptor ring or through the doorbell), the network interface device can read the data packets in the packet buffers 211 pointed to by that descriptor. The data packets in the data packet buffer 211 may be read by pulling the data from the data packet buffers 211 using direct memory access.

The data packets may be stored for example in the processing pipeline 221 where the network interface device may process the packet data for transmission. For example, in some embodiments, the data packets may be used to form frames and/or lower layer protocol processing may be carried out on the packets to prepare them for transmission over the network. In one example protocol such as transmission control protocol over internet protocol (TCP/IP) checksum offloads may be carried out in the processing pipeline 221.

As can be seen in relation to FIG. 2, in DMA the data to be transmitted is identified using the descriptor ring and doorbell write, however, the actual data transfers are handled asynchronously by the network interface device. In other words, the CPU of the host computing device need not carry out the data transfers but may indicate to the network interface device which data is to be transferred by the network interface device.

The foregoing has given the use of an IOMMU as an example. In other embodiments a buffer table may be implemented. A buffer table may be used to provide an address protection mechanism. In this case, the network interface may translate addresses posted onto the descriptor rings into PCIe bus addresses. This way an unprivileged process would not have access to physical addresses. This step may be made redundant through use of an IOMMU device (which will perform the address translation). In this example, the buffer table may be associated with a specific transmit descriptor ring 212. For example, some entries of the buffer table may be associated with the transmit descriptor ring 212. The private address space of the packet buffers 211 may be accessible to the buffer tables associated with the descriptor ring 212.

Using direct memory access may be suited for the transfer of large amounts of data as the network interface is able to pull data from the host memory without the host CPU having to execute load/store instructions. However, in some cases, DMA may incur a latency. Programmed input/output (PIO) offers an alternative to DMA in some embodiments of data transfer to a network interface. In PIO, a host CPU may execute instructions to transfer data from the host to the network interface. In some cases these instructions may be register store operations to a non-cached memory.

Some embodiments of the present application may implement programmed input/output (PIO) in order to transfer data from the host computing device to a peripheral device such as the network interface controller. In the below examples PIO is sometimes described in relation to a user level context, however it will be appreciated that it may be associated with other software supported by the host computing device, for example a user level application, thread or process, an operating system and/or a hypervisor driver context.

In some aspects of these embodiments, PIO may be implemented as the primary or only mode of transfer. In other aspects, PIO may be implemented in conjunction with DMA when transferring data from the host computing device to the network interface device. In these embodiments, the DMA data transfer may be carried out similarly to that described in relation to FIG. 2.

It will be appreciated that in embodiments, DMA transfers and PIO transfers may have different characteristics and the type of transfer to be used may be selected in dependence on the required characteristics. For example, in some embodiments, PIO transfers may incur a lower latency than DMA transfers and may for example be selected to carry out the transfer of time sensitive data. In a further or alternative example, DMA may have the capability of transferring larger amounts of data and may be selected when a larger amount of data is to be transferred.

In embodiments PIO transfer may be carried by writing data to be transferred to a template on the network interface device using PIO. In other words the data may be transferred to the template by operations carried out by the host computing device CPU. For example, through load/store operations carried out by the host computing device CPU over a bus between the host computing device and the network interface device. This may differ from DMA where memory accesses may be carried out while bypassing the host CPU.

In the implementation of PIO, a descriptor ring and/or doorbell may be used to indicate that data is available for transmission. The host computing device may indicate to the network interface device that data is available in the template by writing a descriptor to a descriptor ring and/or a doorbell. The descriptor may point to the template of the network interface device to which the data was written.

In some embodiments, both a descriptor ring and a doorbell may be implemented, for example a doorbell may be an indicator that data is available, a first descriptor of a data transfer may be written to the doorbell in some embodiments to avoid the latency of a first access to the descriptor ring. In other or further embodiments, the functionality of the descriptor ring and the doorbell may be combined. For example, descriptors may be written to a queue which serves to indicate that data is available as well as provide a descriptor pointing to that data.

The network interface device may receive an indication that data is available in a template (either through the doorbell or the descriptor ring or both) and process the data in the template for transmission. For example, the network interface device may further protocol process the data and output the data to the network.

A template may be a buffer which is assigned to an software context. For example when PIO is being carried out by an application, one or more template(s) may be assigned to an application context. In the case where PIO is being carried out by an operating system, one or more template(s) may be assigned to an operating system context. In some embodiments a context may be a process or a thread carried out by software, for example application, operating system or a hypervisor driver.

An application may be, for example, user level software having one or more processes and/or threads. The template could hold one or more entire data transmission units, for example a frame such as an Ethernet frame. The template could for example be defined to only hold the payload data, or some other region of the packet. In one embodiment, software may write an one or more entire frame(s) of data to the template. This may be the case where an application just calls send( ) with payload data. The internals of the send( ) call may construct an entire frame. In another or further embodiment, the application may be provided an application programming interface (API) to update a template with editing operations. Through these operations, portions of the template can be populated. In this case, a subsequent send( ) may only need to transfer the headers.

In some embodiments the template may be a scratch pad memory. The scratch pad memory may be associated with a process that is requesting and/or carrying out a data transfer and in some examples the memory space in which the scratch pad resides may only be accessible to that process. When the process is not using the template for transmission it may access the template as a scratch memory. The scratch pad memory may be a high-speed memory internal to the network interface device and may be used for temporary storage of the transmission data. The data for transmission may be temporarily held in the scratch pad memory or template before being transmitted onto the network.

In some embodiments, the template may hold multiple frames. Descriptors may point at arbitrary offsets into the template, this may allow multiple outstanding transmits to be made, in order to sustain a high aggregate message rate. (In some embodiments, once a doorbell has been posted indicating a transmission, the software may not touch/re-use the template region referenced by the corresponding descriptor until after a transmit completion event has been received.) It may be possible to post multiple outstanding transmission requests to different regions of the same template corresponding to different Ethernet frames, as well as to regions of different templates.

In some embodiments, the template may comprise headers corresponding to lower layer protocol processing. The template may for example contain headers corresponding to a transport layer protocol and the data to be transferred may be transferred into the template. In some examples, the data to be transferred may have protocol processed for the upper protocol layers. The template may comprise a buffer. In some embodiments the template may comprise a maximum transmission unit sized buffer.

In one embodiment for PIO transfer the descriptor ring and doorbell may be used similarly to those as described in relation to FIG. 2. In this case however, the descriptor will point to a template on the network interface device instead of the packet buffers 211 of the host computing device. In an embodiment where both PIO and DMA are implemented, a DMA descriptor will point to the packet buffers 211 of the host computing device and a PIO descriptor will point to a template on the network interface device, however both types of descriptors may be written to the same descriptor ring. In some embodiments, an order in which packets appear on the Ethernet is the order in which they are pushed onto the ring regardless as to whether they are PIO or DMA. In some cases each of the PIO transfer mode and the DMA transfer mode may have their own descriptor ring.

In some embodiments, a descriptor ring may be used to control processing within in the network interface device. For example, the descriptor ring may be configured to store commands. This may be in addition to descriptors in some embodiments. The commands may be posted to the descriptor ring. The commands may control the behaviour and/or operation of the network interface device. For example the commands may control the behaviour of the NIC with respect to the processing of subsequent descriptors. Examples of such commands may include whether or not to calculate checksums, transmit segmentation offload and/or interrupt moderation.

For example, in some cases, a cut through transmit may take place. A cut-through transmit may bypass some protocol processing, for example by pass any IP checksum calculations carried out by the network interface device. A command may be posted to the descriptor ring indicating that a transmit cut through is to be initiated for PIO (or DMA) transfer. A further command descriptor could later be pushed to revert the mode to normal (non cut-through transmit) behaviour.

In some embodiments therefore, the data posted to the descriptor ring or queue may be a descriptor pointing to data in a template or a command indicating a change in behaviour of the network interface device.

Figure 3:
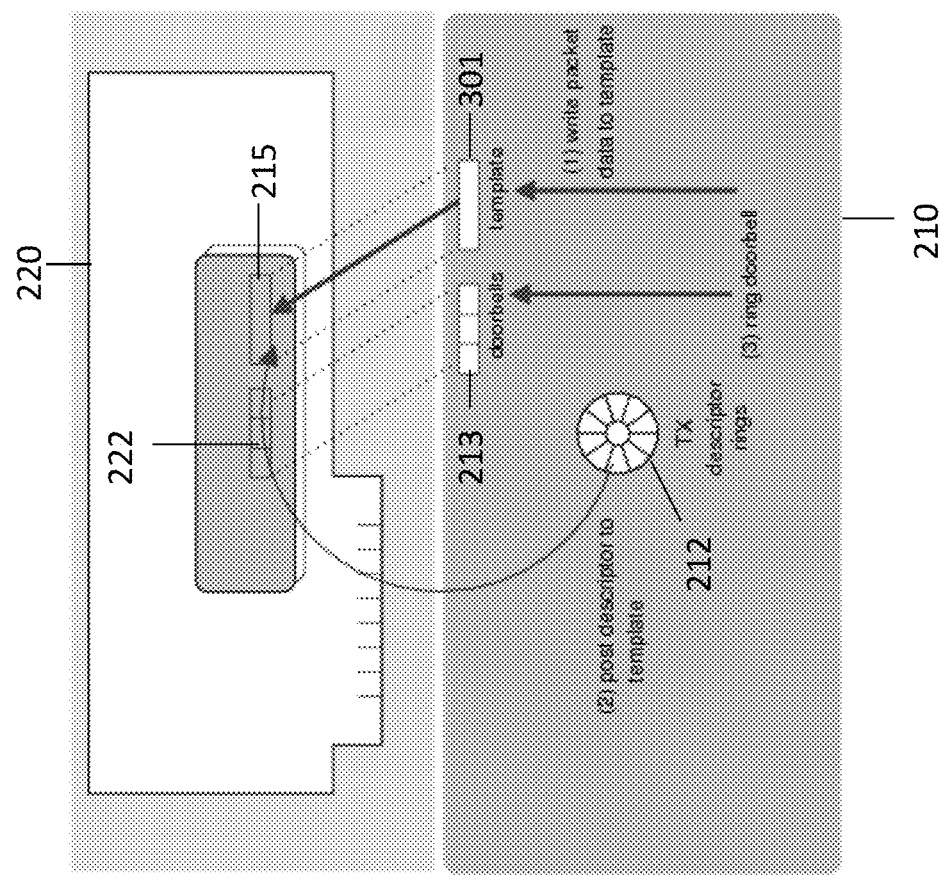
FIG. 3 is a conceptual diagram of a data processing system implementing a programmed input/output mode.

FIG. 3 shows an example of a PIO mode of operation.

In PIO mode, a host may transfer data directly from a host to a peripheral device using load/store operations carried out by a host's CPU. For example, the data may be transferred over a PCIe bus. The data may be transferred through non-cacheable memory. In some embodiments, the PIO mode may be considered to be a low latency mode of data transfer.

FIG. 3 is a conceptual diagram of a host computing device 210 and network interface device 220 and method steps (1), (2) and (3) for implementing a PIO mode of operation.

The host computing device 210 of FIG. 3 comprises a descriptor ring 212, doorbell 213 and template 301. It will be appreciated that the descriptor ring 212 and the doorbell 213 may be similar to those described with reference to FIG. 2. The template 301 may be a region of memory that is memory mapped to the address space of the user-level process requesting the data transfer. For example, in some embodiments, the doorbell 213 and the template 301 may be regions of memory of the network interface device and memory mapped to the user level process.

Doorbell 222 and template 301 shows the memory region of the network interface device 220 where the doorbell and template are stored, while the doorbells 213 and template 301 shows the memory mapping to the address space accessible by the user level process. It will however be appreciated that this is by of example only and the memory is mapped so that the user level process and the network interface device have access to shared memory.

In particular, the template 215 exists on the network interface 220 but is memory mapped to the address space of the user level process shown as template 301. The template may be owned by software running on the host computing device, for example the user level process or end-point. In some embodiments the template may be the size of a one or more maximum transmission unit (s), for example a transmission frame.

The template may for example hold multiple frames so that software can pipeline transmissions. If the buffer comprises only one frame it may have to wait for an event from the hardware after every send( ) before it is able to start writing the next frame.

The software (in some examples the user level process, operating system or hypervisor driver context) may have access to the template via the memory mapping as described above or any other appropriate means. The software may write data which is intended for transmission to the template 215 and form a descriptor pointing to the template 215 on the host computing device. The descriptor may be written by the software to the descriptor ring. The descriptor is then available to be read by the network interface device and to indicate to the network interface device that data for transmission is available in a template to which the descriptor points.

Each user level process (or other software carrying out PIO transfers) may be associated with one or more templates into which data may be written. A descriptor may point to the data in the template. The descriptor may identify the template to which the data was written and in some cases may include an offset when the data is written to only part of the template. For example a template may be the size of more than one transmission unit and the descriptor may identify the template as well as indicate where in the template the data was written to. In this manner, the network interface device may be made aware when new data is written to the template. In some embodiments the network interface device may determine whether data is ready for transmission, for example when one or more full transmission units have been written to a template.

A descriptor may indicate that a transmit should occur from a template pointed to by the descriptor. The descriptor may be processed by the network interface device. The descriptor could for example have been read from the descriptor ring, or have been included in the doorbell write.

It will be appreciated that the doorbell may provide an indication to the network interface device that descriptors are available in the descriptor ring in a similar manner as discussed in relation to FIG. 2. The PIO mode descriptors will however point to templates on the network interface device rather than packet buffers in the memory of the user process or host computing device.

The operation of the host computing device 210 and network interface device 220 of FIG. 3 is shown by steps (1), (2) and (3) of that figure.

At step 1, when data on the host device is available for transmission, the user level process may write that data to a template 215. The user level process (or other software) may write the data using programmed input/output. For example load/store operations may be carried out by the CPU of the host computing device to write the data to the template on the network interface device.

At step 2, a descriptor is written to the descriptor ring 212. The descriptor points to or references the template 215 and optionally an offset to which the data was written via PIO.

It will be appreciated that the template may be associated with the descriptor ring. The descriptor may be written to the descriptor ring as soon as the PIO write to the template is initiated. In other words, the descriptor need not be written only when the PIO operation is complete, however in some cases this may be the case.

At step 3 a doorbell is written to the doorbell 222 via the memory mapping 213. It will be appreciated that this may be similar to the doorbell of FIG. 2. The doorbell indicates or identifies to the network interface device that a descriptor ring contains descriptors that need to be serviced. It will be appreciated that the doorbell may be written to with a first descriptor of the descriptor ring. In this case, the network interface device may begin servicing the first descriptor while it accesses further descriptors from the descriptor ring to service them.

The network interface device may respond to a doorbell being written by processing the descriptor ring (if necessary as the doorbell may have included the first descriptor) and accessing the packet data from the template pointed to by the descriptor.

In some embodiments the doorbell and descriptor ring may be combined. For example, a descriptor written to a queue may indicate to the network interface that data is available and the descriptor may be available to the network interface accessing the queue. This may be of interest for example when small amounts of data are being transferred.

In DMA mode and/or in PIO mode, the network interface device may indicate that a packet has been transmitted via an event notification. The event notification may also indicate that a packet buffer (in the case of DMA mode) or a template (in the case of PIO) is available to be re-used.

Figure 4:
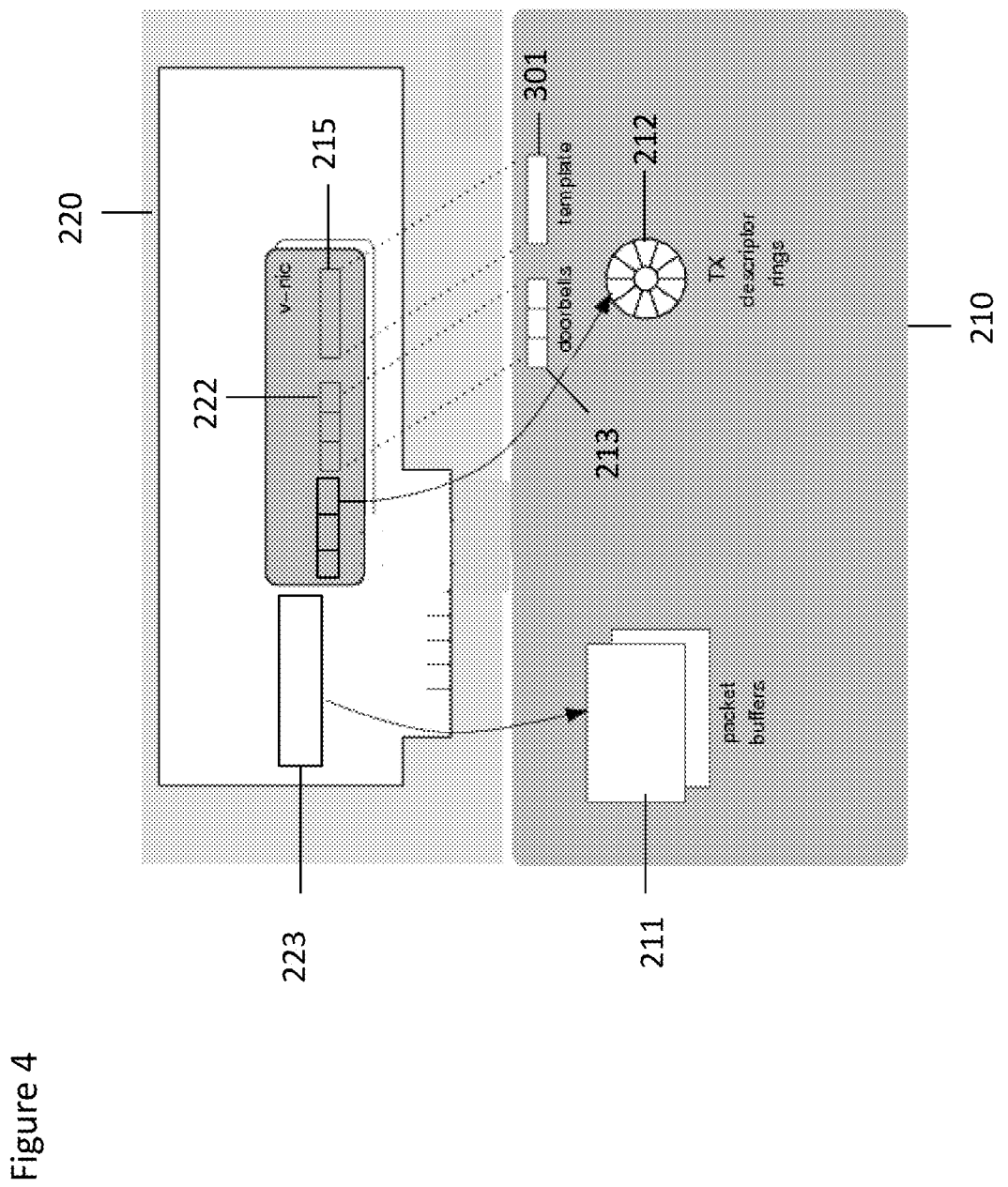
FIG. 4 is a conceptual diagram of a dual mode data processing system.

It will be appreciated that in some embodiments a data processing system may implement both DMA and PIO modes of data transfer. FIG. 4 shows an example of both modes being available in a data processing system.

FIG. 4 comprises a host computing device 210 and a network interface device 220. The host computing device 210 may run one or more user level processes, operating system and/or hypervisor driver contexts. Software running on the host may have access to packet buffers 211 and a transmit descriptor ring 212 in the host memory and memory mappings 213 and 301 to a doorbell 222 and template 215 of the network interface device 220. The network interface device 220 may a processing pipeline 223, a doorbell 222 and templates 215. The doorbell 223 and the templates 215 may be memory mapped to the memory of the host computing device.

The data processing system of FIG. 4 may carry out a DMA mode of data transfer by direct memory accessing data in the packet buffers 211 or a PIO mode of operation by PIO accessing the template 215. Both modes of operation may make use of the descriptor ring 212 and the doorbell 213. In particular, when data is written to the packet buffers 211 in a DMA mode, a descriptor pointing to the packet buffers 211 may be written to the descriptor ring. When data is written to the template using PIO, a descriptor pointing to the template on the network interface device may be written to the descriptor ring 212.

In this dual mode of operation, the descriptors to the templates may be interleaved with descriptors to the packet buffers in a descriptor ring. In this embodiment, the order in which the data frames (for example comprised of the data packets) are to be transmitted may correspond to the order in which the respective descriptors have been written to the descriptor ring. The network interface device will process the descriptors in the order in which they were posted (or written to) the descriptor ring. This is regardless of the mode used to carry out the data transfer.

In the foregoing, the doorbell has been described as being used to indicate that a descriptor ring contains descriptors which are to be serviced or processed. The doorbell may also identify a descriptor ring into which a descriptor has been posted. The descriptor rings contain descriptors pointing to a template or a packet buffer in accordance with the mode of data transfer used for that packet data.

It will be appreciated however that this is by way of example only. In some embodiments the data processing system may not contain both a doorbell and a descriptor ring, but instead a single queue into which descriptors may be posted. The queue will act as an indicator to the network interface device that a descriptor needs to be serviced as well as providing the descriptor to the network interface device. This queue may be suitable for some embodiments for example with a restricted amount of data transfer, as in some examples the queue may become full quickly.

In another embodiment, the doorbell may contain a first descriptor for a descriptor ring. For example, when a data transfer occurs for a packet data buffer or template associated with a descriptor ring (or user level process), a descriptor for that first transfer may be written to the doorbell. The network interface device may receive the descriptor and process the data pointed to by that descriptor. The network interface device may further access the descriptor ring and process any descriptors that may have been written there subsequently. The doorbell may therefore only be written to when the network interface device is not already busy accessing the descriptor ring.

It will be appreciated that the first descriptor need not be written to the doorbell, the doorbell may identify the descriptor ring with a descriptor written to it and the network interface device may access the descriptor from the descriptor ring in some embodiments.

The network interface device may receive an indication of a data to be transmitted and access a descriptor pointing to the data that is to be transmitted in a template. This indication may be received through a doorbell and the descriptor may be accessed from a descriptor ring. Alternatively the indication may comprise the descriptor.

It will be appreciated that in some embodiments the data transferred from the host computing device for transmission may include payload data. In some embodiments, the payload data may have been partially protocol processed. For example the data for transmission may have been processed in accordance with one or more upper layer protocols and may be lower layer protocol processed at the network interface device. In other embodiments, only the payload may be transferred. For example the data may be written to an application for transmission by a protocol like transmission control protocol (TCP).

The application may write for example 1000 bytes into a template. The protocol might dictate that only 500 bytes may be transmitted without receipt of an acknowledgement from the other side. It would be up to the protocol stack to decide how much and when to transmit. In some examples, the template may not be returned to the application for re-use until a TCP acknowledgement has been received to tell that the link partner has successfully received the data The PIO mode, embodiments may make use of templates in the network interface device. In one embodiment, a first part of the template can be filled during a first data transfer and a second part of the template may be filled during a second data transfer. In some embodiments, the template may be filled in multiple writes. For example, if some or all of the packet data is known in advance of the required time to transmit, then host software can push this data in advance to the template. This data may be pushed using the CPU load/store operations in accordance with PIO. At the time of transmission, only the final portions of packet data need be transferred to the template.

Filling a template in two or more writes may for example be useful in financial service/trading applications. For example, an algorithm might wish to trade a large number of securities but the bid/ask spread might be moving. In these embodiments, a message to offer to trade may be pre-written—this may be for example a packet based on the financial information exchange (FIX) protocol over TCP and would include details such as the security and the offer. At some later time, following receipt of market data the number of shares to initially offer and the price would be determined. At that point the trade message may be completed and transmitted with the least possible delay.

As described above, once a packet has been transmitted by the network interface device, the network interface device sends an event notification indicating that the template is available for reuse. The transmitted packet will remain in the template until it is overwritten by a subsequent data transfer.

In this case, it is possible to reuse parts of the packet already in the template. For example, if only some of the information in the packet needs to be updated, those parts may be written to the respective parts of the template. The entire packet data need not be re-written. Packet differences between a previously transmitted and currently to be transmitted packet may be pushed to the template for transmission. In some embodiments, this may result in a reduction of data required to traverse the IO bus and may reduce latency.

In another embodiment, the network interface device may be required to perform a unicast fan-out function in transmission. A unicast fan out function may comprise delivering or transmitting a single unicast message to a number of network endpoints. One method of carrying this out would be to carry out several message transmission, each addressed to a respective network end-point. In an embodiment of the present application, the template mechanism may be used.

In this embodiment, packet data may be written to the template once. As discussed, the packet will remain in the template after transmission until it is overwritten. Subsequent packets may be prepared for transmission by updating only the packet headers. The updated packet headers may reflect the respective destination end-points of the unicast fan out.

In this embodiment, data destined for more than one endpoint may be transferred to the template. The data in the template may be transmitted to a first endpoint. Packet headers corresponding to a second endpoint may then be pushed to the template. These packet headers to the second endpoint may overwrite packet headers corresponding to the first endpoint already in the template. The data in the template may then be transmitted to the second endpoint. It will be appreciated that this may be continued for any number of endpoints.

In some embodiments the network interface may comprise a virtual network interface. In some embodiments the template may be accessed via a library, for example an OpenOnload library. The library may convert messages from a user level process to be used by a virtual network interface. Extensions to the library may be added to allow sockets to take advantage of the features of the templates. For example, applications accessing the network at the Portable Operating Systems Interface (POSIX) socket abstraction level may be enabled to take also advantage of some of the features.

It will be appreciated that in some embodiments, some of the network interface processing may occur in a kernel or kernel space or in the context of a hypervisor.

In some embodiments the template may include a number of fields, for example a header or payload data field. When updating the fields using a number of writes, a bus transaction may be required per field. In an alternative embodiment, a message may be sent to the network interface indicating for example the number of fields of the template to be updated and the offset and/or extent of each update. The update may for example be sent by a single or a set of contiguous bus transactions. The network interface may receive the bus transaction and unpack the fields according to the information in the bus transaction as well as the information in the message. For example the bus transaction may comprise a PIO data transfer from the host device. The network interface may unpack the data in the PIO data transfer into the template based on the information in the message.

A second embodiment of the present application is concerned with the transmission of data packets onto a network, for example, the network 103. The data transferred to the network interface device may form a data transmission unit to be transmitted onto the network. The data transmission unit may be, for example, a data frame and may comprise payload data encapsulated according to protocol layers.

In order to allow a receiving entity to confirm that a data transmission unit has been correctly received, the data transmission unit may include check data. One example of check data may be a checksum or hash sum. This may be an arbitrary sum computed from the digital data. The checksum may be inserted into the data transmission unit before or during transmission. If an error has occurred in the transmission, a checksum calculated from the data received at a receiving entity will not match the checksum inserted into the packet.

In some data processing systems, a checksum is calculated for a data transmission unit and is inserted into the header of that data transmission unit. This however requires that the entire data transmission unit is available to a checksum calculator prior to the transmission of the data transmission unit. In order to do this, the data transmission unit is buffered prior to transmission. The transmission latency therefore includes this buffering latency.

As described with reference to the first embodiment, a descriptor to a template or a packet buffer may be made available to the network interface device as soon as the packet data begins to be stored in the packet buffer or the template. In the case of a DMA mode, the network interface device may start transmitting data from the processing pipeline while the remaining parts of the data packet are still being pulled from the packet buffer of the host computing device. While this may avoid the latency of having to buffer (store and forward) the whole packet, there is a risk that there may be a delay in the pulling of packet data from the packet buffer. In other words, a transmission into the Ethernet media access control (MAC) may be initiated but the frame may arrive at a slower rate than required in order to satisfy the transmission rate of the network. This is called a data under-run.

In some embodiments the risk of data under run may be reduced by using PIO mode of transfer as data may be available in the template before transmission, however in some situations, a pause in the availability of data may occur, for example due to memory bandwidth and/or internal network interface device contention for resources.

In these cases, software at the host (for example a user level process, application, operating system or hypervisor driver context) may have pre-calculated the checksum for the data transmission unit, for example the software may have bypassed the checksum offload engine by processing the checksum itself. The network interface hardware may only need to push the packet onto the wire or network as it is received from either host memory or the template. If (for example due to memory bandwidth pressure) there is a pause in the transmission the partial frame being transmitted onto the network cannot be halted and there is no further data to complete the transmission.

In embodiments of the present application, data forming a data transmission unit may be monitored as it is transmitted onto a network. If a pause is detected in the transmission of the data, for example a data under run condition is detected, the parts of the data transmission unit already transmitted may be stored and invalid data may be transmitted onto the network as part of the data transmission unit. The invalid data may corrupt the packet such that the packet is considered to be invalid by a receiving entity. For example, the (partial) data transmission unit may be corrupted by truncating the packet and inserting a bad checksum value (for example an Ethernet frame consecutive sequence (FCS)) at the end of the frame. In some embodiments, the data transmission unit may then be resent using the stored data and data of the data transmission unit that is subsequently made available.

The data may be transmitted as part of the network interface device pipeline. Once the network interface device has started a packet transmission, it keeps feeding packet data onto the network at the rate of network transmission. The hardware may pull the data to be transmitted from an ingress FIFO (in the example of DMA) or template (in the example of PIO) and push it to an egress FIFO and/or to an Ethernet MAC block. The hardware may detect an underflow when the ingress has no data. In this case it may, for example, export a data_ready signal. In one embodiment, a monitor may know that the transmission onto the network has experience a pause, for example has not been able to satisfy the MAC and should be aborted based on the data_ready signal. The monitor may continue to pull/discard the (now late) remainder of the frame and terminate the frame which has already been initiated at the MAC by adding a bad CRC and ending the transmission. The module may report to a front end DMA manager (in the case of DMA) that a frame has aborted so that the entire transaction can be repeated.

The monitor had been described as being separate to the hardware pushing data onto the network. It will however be appreciated that the monitor may form part of the hardware pushing data onto the network and/or may carry out the transmission of data onto the network itself. For example the functionality of the hardware and the monitor may be combined.

Figure 5:
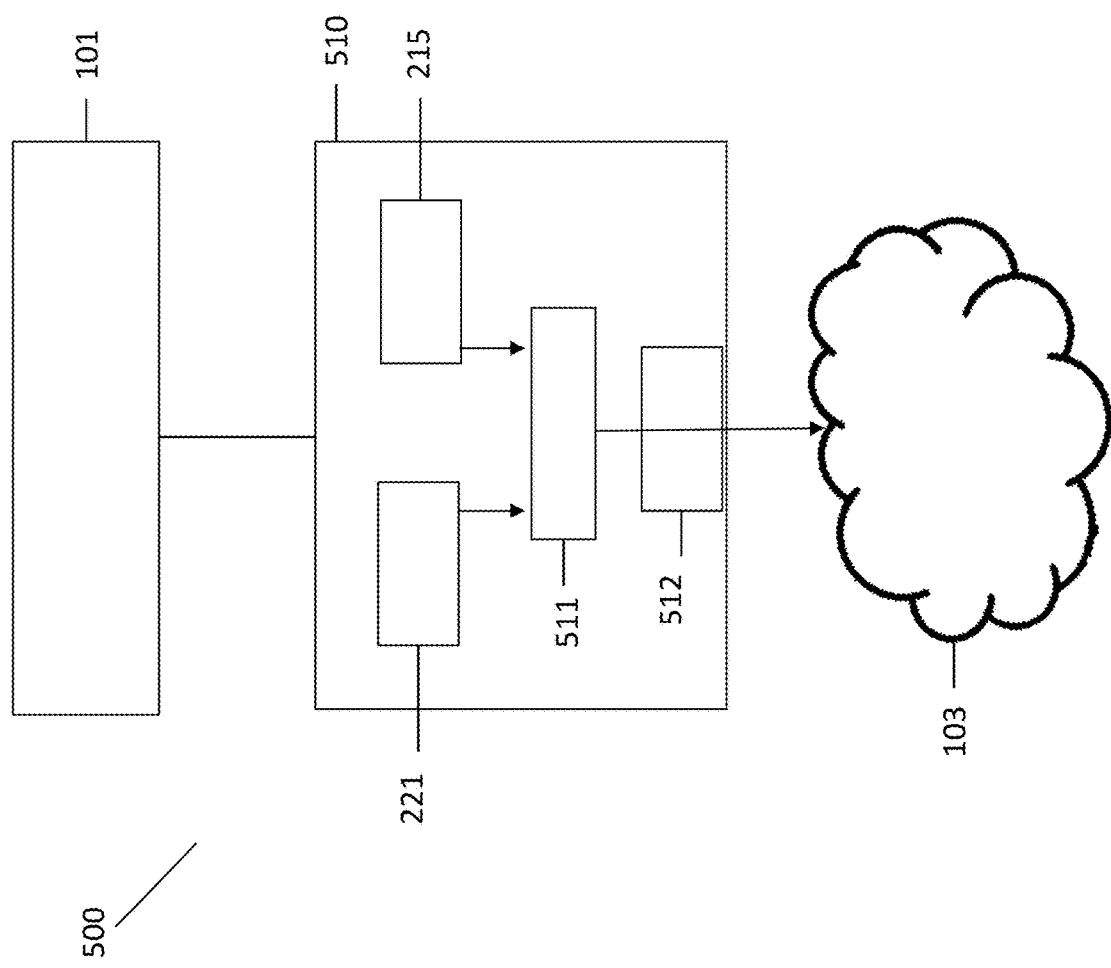
FIG. 5 is a schematic diagram of a data processing system in which a second embodiment may be implemented.

FIG. 5 shows an example of a data processing system 500 in accordance with the second embodiment.

The data processing system 500 comprises a host computing device 101, a network interface device 510 and a network 103. It will be appreciated that in some embodiments, the data processing system may implement aspects of the first embodiment.

The network interface device 510 may comprise a protocol processing engine 511 and a monitor 512. Optionally the network interface device 510 may comprise a network interface packet buffer 221 and a template 215, however it will be appreciated that data to be transmitted in the second embodiment may come from any suitable location.

Data to be transmitted may be passed through the protocol processing engine 511 and monitor 512 before being transmitted on to the network. It will be appreciated that the protocol processing engine may protocol process data to be transmitted to be in accordance with the lower layer protocols. For example the protocol processing engine may provide transport layer protocol processing, for example by calculating and providing checksum information. Alternatively a checksum for the packet may be calculated in software and added to the data transmission unit before transmission. It will however be appreciated that the protocol processing engine in embodiments is optional.

The monitor 512 may be configured to monitor the transmission of data transmission units onto the network and detect whether there is a pause in transmission. For example the monitor may determine whether there is a pause in the transmission indicative of a data under-run. This may be due to for example a memory bandwidth limitation. The monitor may, in response to a determined pause, insert invalid bits into the data as it is transmitted. The invalid bits are such that a receiving device would determine that the data transmission unit is corrupt and/or is invalid.

The invalid bit(s) in some embodiments may correspond to an invalid checksum value inserted into the packet. The partially transmitted packet may further be truncated and that transmission of the packet transmission unit ended. In some embodiments the data transmission unit may have been transmitted with a first checksum in its header. The monitor may generate a further checksum to be inserted into the tail of the packet. It will be appreciated that the tail may form the tail of the truncated packet. The checksum may in some examples be a frame consecutive sequence (FCS) checksum.

The monitor may further be configured to resend the data transmission unit as soon as any missing data in the data transmission unit is available. For example, the monitor may store the parts of the data transmission unit that have already been transmitted and then retransmit the data transmission unit using the stored part and subsequently received data of the data transmission unit.

Figure 6:
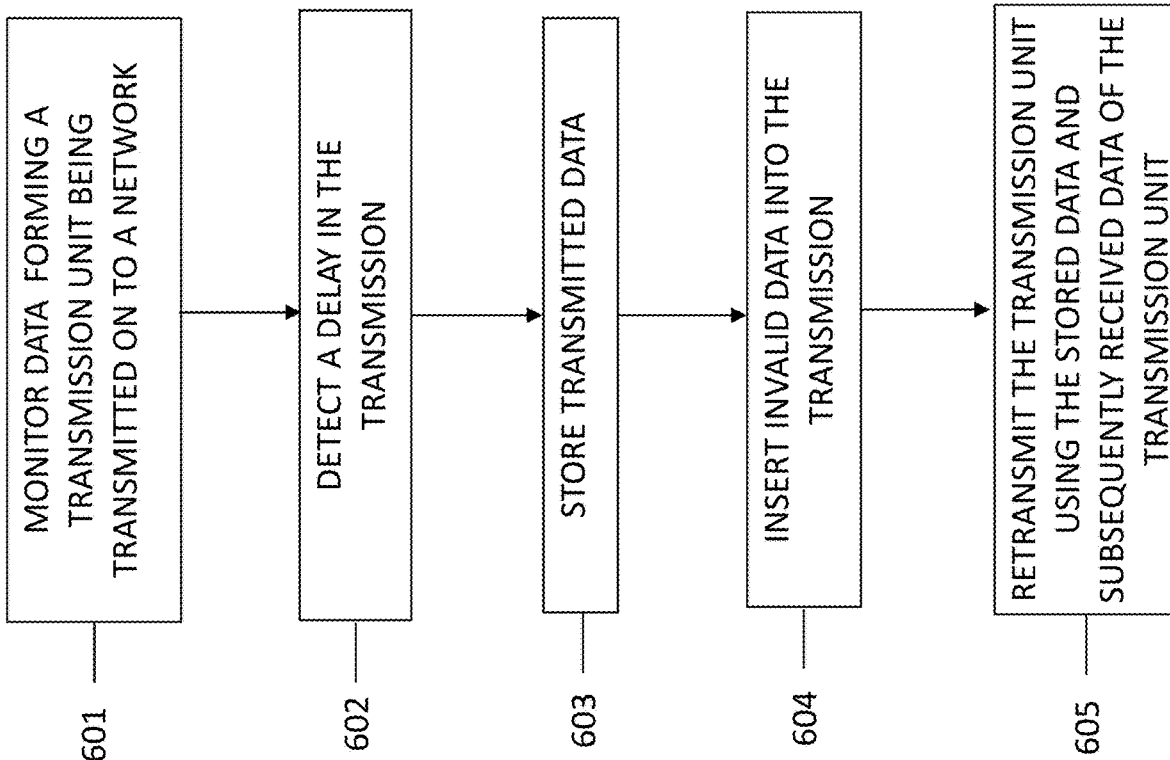
FIG. 6 is a flow diagram depicting the method steps in accordance with one example of the second embodiment.

FIG. 6 is a flow diagram depicting the method steps that may be carried out by the monitor 512.

At step 601, the monitor monitors the data being transmitted onto network. The data may be part of a data transmission unit. In some examples, the data transmission unit may comprise a header and payload data. The data transmission unit may for example include a first checksum. This checksum may be included in the data transmission unit head. The first checksum may have been generated by software.

At step 602 the monitors determines that there is a pause in the transmission of data. The pause may be indicative for example, a data under run condition.

At step 603, the data that has been transmitted onto the network is stored by the monitor. It will be appreciated that while this step is shown sequential to step 602, it may be carried out concurrently. In other words, data being transmitted may pre-emptively be stored at the monitor even if no under-run condition is determined.

At step 604, in response to the pause or data under-run condition being determined, the monitor may insert invalid data into the transmission that is forming the data transmission unit. In some embodiments, the monitor may insert a sequence of bit that are known to be invalid. The monitor may insert any data that will cause a receiving device to determine that a received data transmission unit is invalid or in error.

The invalid data may for example correspond to a checksum or cyclic redundancy check. For example a second check data in the packet. The checksum may be a frame check sequence (FCS) cyclic redundancy check (CRC). In some embodiments, step 604 may truncate the partially transmitted data transmission unit and insert the invalid checksum in a tail of the transmission unit.

In this manner, a data transmission unit is put onto the network even though not all of the data for the transmission unit is available. The data transmission unit placed onto the network may comprise invalid check data in the place of the data of the transmission unit that was not yet available.

At step 605, the monitor may retransmit the data transmission unit but this time include the data for the data transmission unit that has become subsequently available. A correct data transmission unit may be transmitted shortly after the data transmission unit containing invalid data.

It will however be appreciated that steps 603 and 605 may be optional. In some embodiments, retransmission of a data transmission unit may not be carried out. In other embodiments the retransmission of a data transmission unit may not be carried out by the monitor.

For example, the monitor may inform another entity that the data transmission unit was transmitted with invalid data. In this case, the other entity may initiate a retransmission of the data transmission unit. In one example, the monitor may inform a transmit TX DMA engine to retry the entire transaction. In this case, frames from other TX queues which would be following in the processing pipeline would not need to be paused while the invalid data transmission unit is retransmitted. However, in some cases, for a corrupted frame or data transmission unit, latency may increase because in some circumstances the data would be pulled again from host memory.

In some embodiments the monitor may insert the invalid check data in such a way that a receiving device such as another network interface card, host device and/or network switch determines that the packet is invalid or corrupted. For example, the data transmission unit may be corrupted in such a way that a next Layer 2 device, for example a network switch, will detect that the data transmission unit is corrupt and discard it in a link layer. In this case, the receiving device may not send a request for retransmission of the packet. The monitor may retransmit the packet as soon as the remaining data of the packet is received. The monitor may transmit the data transmission unit while bypassing any need to send a retransmission request.

It will be appreciated that the monitor which may be a monitor, monitoring means or monitoring device may form part of the network interface device hardware in some embodiments. The monitor may form part of the hardware for the transmission of data onto the network in that it may be a modification to such hardware, Alternatively the monitor may be provided in addition to such hardware, The monitor may for example have access to a memory in some embodiments. In some embodiments, the monitor may make a determination in hardware. In other embodiments, the monitor may be implemented in software. For example the monitoring may be in accordance with instructions stored on a computer readable medium and carried out on a dedicated or generic processing device. In this case, the monitor may be implemented in software on the network interface device, for example embedded on the network interface device.

Embodiments of the present application may be implemented in a data processing system comprising a host computing device and a network interface device. The network interface device may be configured to couple the host computing device to a network.

While the foregoing has outlined embodiments of the present application directed to the transfer of data from the host device to the network interface device and the transmission of data onto the network, the network interface device may be configured to carry out further functionality.

Potential further functionality of the data processing system will now be described however it will be appreciated that such further functionality is optional and is not limiting to the embodiments as described above.

Figure 8:
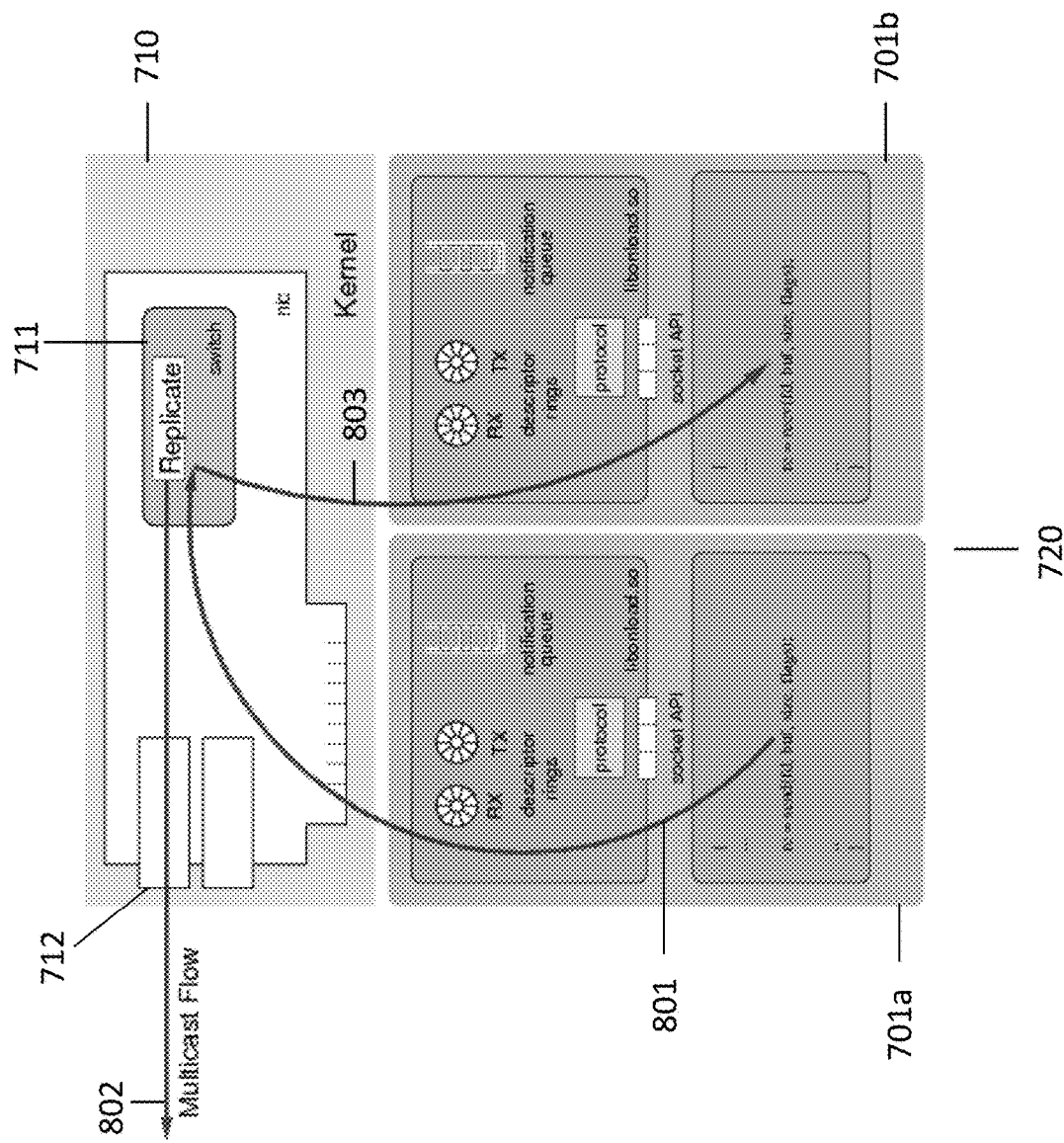
FIG. 8 is a conceptual diagram of a data processing system implementing a further aspect of multicast flow replication.
Figure 9:
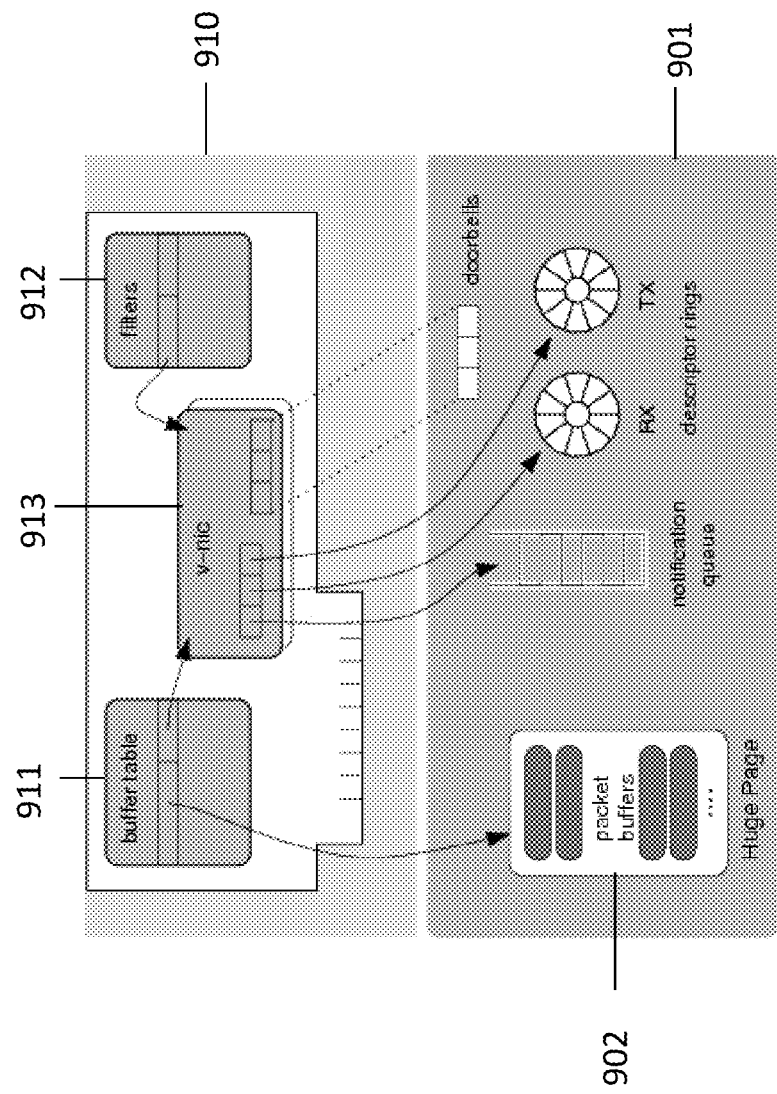
FIG. 9 is a conceptual diagram of a data processing system implementing address translation services.
Figure 10:
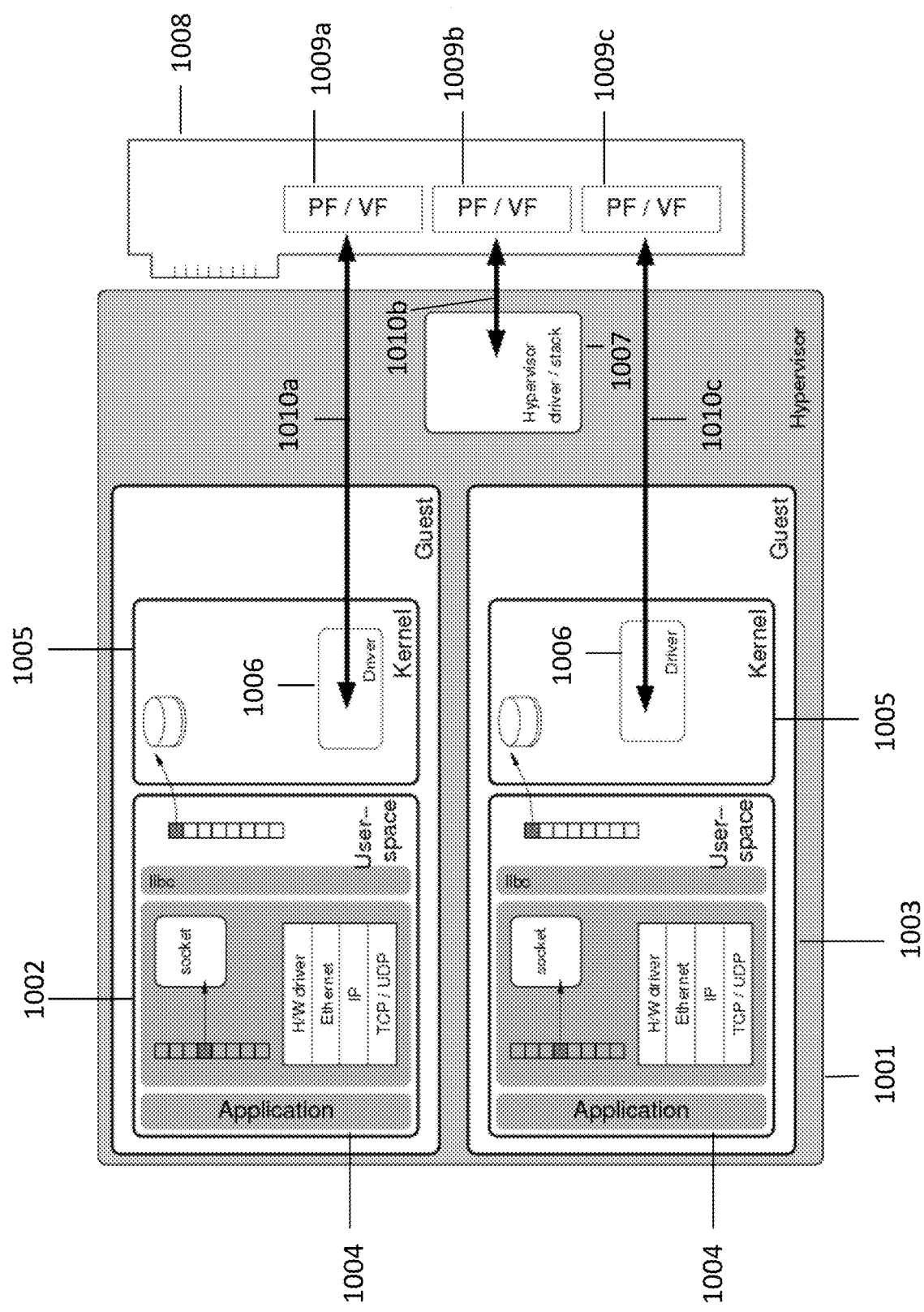
FIG. 10 is a conceptual diagram of a data processing system supporting guest operating systems.

Further aspects and functionality of the present application may include the replication and switching of multicast packet flows (depicted in FIGS. 7 and 8), microburst resiliency through unified switch architecture, scalable address translation (as depicted in FIG. 9), timestamping and virtualisation (as depicted in FIG. 10).

Figure 7:
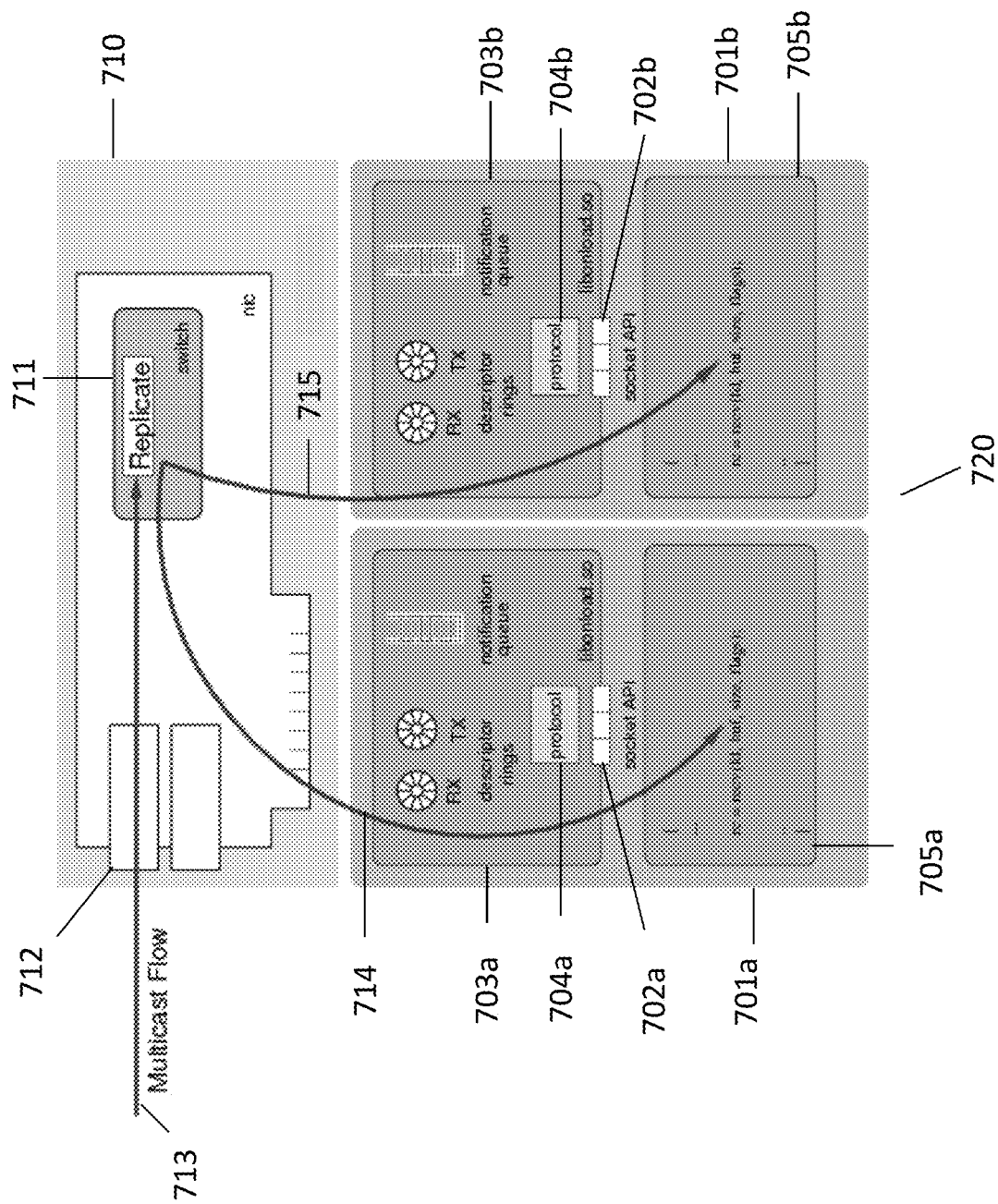
FIG. 7 is a conceptual diagram of a data processing system implementing multicast flow replication.

FIGS. 7 and 8 show examples of the replication and switching of multicast packet flows.

FIG. 7 comprises a first user level process 701*a*, a second user level process 701*b* and a network interface device. The first user level process may comprise an application 705*a* and an application programming interface (API) socket 702*a*. A socket may be considered to be an endpoint in a network communication. An API may allow and application to generate and use network sockets in the network communication. The socket API (702*a*) may be coupled to a socket library 703*a*. The socket library 703*a* may be configured to for example provide user level protocol processing. The library may for example further provide transmit and receive descriptor rings and a notification queue that may be used for communication with the network interface device 710.

It will be appreciated that the second user level process 701*b* may be similar to the first user level process 701*a*

The network interface device 710 may comprise network ports 712 through which data may be received from the network as well as a switch 711.

In the example of FIG. 7, the independent threads may subscribe to a same multicast flow. For example the first user level process and the second user level process may both be subscribed to a first multicast flow 713 arriving from the network. In some previous systems, host software may have been required to copy such flows to the different application threads, for example using the OpenOnload stack sharing mechanism. However in the present application, this operation may be performed entirely within the network interface device. In some cases this may result in the elimination of software copies and any inter-process synchronization.

FIG. 7 shows an internet protocol (IP) multicast flow 713 which has been subscribed to by two distinct user-level processes 701*a* and 701*b*. Each process 701*a*, 701*b* may be linked with a socket library 703*a*, 703*b*, for example the libonload.so protocol library. The library, during the handling of a multicast join operation, may insert a filter at the network interface device 710 to request the IP flow 713 be delivered to its receive descriptor ring. For each installed filter, the network interface device may replicate the incoming frames of the flow and deliver independently to each of the receive rings of the subscribes user level processes.

For example, in FIG. 7, the multicast flow 713 is replicated at the switch 711 at the network interface device. Each copy of the multicast flow is delivered to a respective subscribed process. For example a first copy 714 of the flow is delivered to the first user level process 701a and a second copy 715 of the flow is delivered to the second user level process 701b.

The switch 711 may carry out switching to replicate the multicast flow 713. This switching feature is fully symmetric. In other words, the switching feature may deal equally with multicast flows originating from a user level process running on a host computing device 720 of the data processing system. This may be seen for example in FIG. 8. It will be appreciated that the features of FIGS. 7 and 8 may be similar and like numerals have been used to indicate like.

In FIG. 8, frames arriving at the network interface device from a transmitting process 701a on the same host as a consuming application 701b may be replicated and switched both onto the physical Ethernet port as well as back to the host 720. The operation may take place without any software cross-talk between the applications 701a, 701b. Filtering operations may be specified flexibly from any of the frame header bits in some examples. This would allow for example, applications to subscribe to multicast feeds which differ only by VLAN.

For example, the first user level process 701a may generate a multicast flow 801 which may be switched at the network interface device 710 to be transmitted to a subscribed user level process 701b on the same host computing device 720 as the first user level process 701a as well as onto the network 802 for subscribed processes on other devices.

A further aspect may be concerned with microburst resiliency.

The network interface may be configured to behave as a non-blocking switch fabric with fully virtualized internal buffer management. This may allow all of the data-path buffer memory within the network interface device to be efficiently and flexibly managed, for example to address the demands of all the physical and virtual ports of the device. For example, consider the scenario of a heavy burst of traffic arriving on a port and (perhaps due to host memory bandwidth limitations) which cannot be delivered to the host at line-rate. In this case, in one example one port may be allowed to use buffering that may be transiently available because another port is relatively idle. The scheduling decisions regarding the allocation of the buffers may be fully under the network interfaces firmware control, enabling memory management algorithms to be deployed. The network interface may in some examples be able to deliver to the host at a sustained data-rate greater than 60 Gb/s. This may along with the shared buffering resources, may in some cases address resilience during peak traffic conditions.

Some further aspects may relate to scalable address translation.

Address translation may be used to protect the integrity of a shared address space. In this aspect, system integrity may be taken into account while providing unprivileged address space access to direct memory access (DMA) capable virtualized hardware. In this aspect an address translation service (ATS) is supported between application virtual memory and the PCIe bus physical addresses required by the network interface device for DMA operations. This function may be provided with mature driver support.

In some address translation services, each address translation entry may for example map a 4 KB or 8 KB page size. This may enable a fine grained scatter gather operation however, the small page size may consume a large number of address translation service (ATS) entries within the network interface device (for example 30K per Onload stack instance) in some cases. Exhaustion of the ATS (which may in some examples also be known as a buffer table) resource then has to be taken into account. If no ATS entries are available, the library may be unable to allocate DMA coherent buffers and may resort to processing network flows via kernel resources and therefore with reduced performance.

FIG. 9 comprises a user level process 901, which may be supported by an operating system of a host computing device, and a network interface device 910. The user level process may for example also include descriptor rings, notification queue and doorbells in accordance with some embodiments. The user level process 901 may further comprise huge page packet buffers 902. The network interface device may for example include filters 912, a network interface processing pipeline 913 and a buffer table 911. It will be appreciated that the filters may be optional. The buffer table 911 may contain entries mapping the address space to the packet buffers 902 which may be huge page packet buffers.

FIG. 9 shows and example of a network interface device that is able to map up to 4 MB of address space per entry in the buffer tables. When used in conjunction with Huge Page operating system support, each ATS entry may map onto a large number of maximum transmission unit (MTU) sized buffers. In some cases, this may for example enable a 50-100× increase in the number of Onload library stacks which can be allocated concurrently per host.

It will be appreciated that in some aspects, the network interface device may operate with a high speed internal data path and may be compatible with PCIe 3.0 bus speeds.

With respect to timestamping, the network interface device may timestamp every packet on ingress or egress at the Ethernet MAC interface. The Ethernet MAC interface may interface the network interface device with the network. The network interface device may include a temperature compensated oscillator (TCXO) which may enable these timestamps to be taken with high precision. Timestamp information may be carried through the network interface device data-path as meta-data, through the internal switch fabric through to the micro-engines which may be responsible for packet dispatch and notification reporting. The timestamp information may be presented to host software either conventionally, as part of the descriptor completion events, or alternatively by insertion into the Ethernet frame itself.

In some examples, this timestamp feature may be used with a software daemon to synchronize the network interface device oscillator to a network master clock with high precision. As when used with the older generation network interface devices, driver support may be provided to also discipline the server's own oscillator to the network disciplined network interface device oscillator. This may enable accurate software time-stamping in some cases. The system oscillator may have much lower precision than the network interface device TXCO and so for many situations hardware based timestamps are preferable.

In some aspects a combination of the precise time stamping and packet replication features may be useful when used in conjunction with a SolarCapture application. In this application, packets which arrive at a host and are destined for application processing can be time-stamped in hardware and replicated, one copy being delivered to the application for processing, another copy being captured by the SolarCapture application. Rather than connecting a physical appliance, or configuring a SPAN-port on a switch, every server in the data-center may be provisioned as a capture appliance, right at the point that application processing is taking place.

In a further aspect the network interface device may have a mode of virtualization in which there is no hard distinction between drivers attaching to physical or virtual functions and that there is no requirement for a master driver in the system. All resource allocation and the entire network interface device control plane may be managed by the network interface device itself without there being any requirement for communication between device drivers. In some cases it multiple driver stacks, including virtualized driver stacks, may be supported.

In this aspect, each driver can request flow-filtering and other hardware resources directly from the network interface device and it may be possible for the example shown in FIG. 10, to run OpenOnload within a guest operating system in a virtualized environment. Each guest operating system may be completely independent from the other and received dedicated hardware resources to directly access the network. Using OpenOnload in this manner, both the hypervisor and the operating system may be bypassed, enabling performance while maintaining the manageability of a virtualized environment.

When used in this manner, network flows may be processed by OpenOnload within a guest with only slight performance degradation compared with running in a bare-metal configuration. The switching capability of the network interface device may allow broadcast/multicast traffic to be replicated in some cases where necessary for the guest operating systems.

FIG. 10 shows a hypervisor 1001 with a first guest operating system 1002 and a second guest operating system 1003. Each of the guest operating systems may comprise a user space 1004 and a kernel 1005 with a driver 1006. The hypervisor 1001 may further comprise a hypervisor driver/stack 1007. The hypervisor may be coupled to a network interface device 1008. The network interface device may support physical and virtual functions for the first guest operating system 1009a, the hypervisor driver/stack 1007 and the second guest operating system 1009c. The requests for resources, for example the flow filtering, can be seen at 1010a, 1010b and 1010c.

It will be appreciated that the network interface device may be implemented for example by an application specific integrated circuit (ASIC). In some examples the network interface device may be a network adaptor, network interface card and/or a network interface controller.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A network interface device arranged to couple a host computing device to a network, the network interface device comprising:
   a buffer for storing a data packet received from the host computing device, wherein the buffer is configured to store the data packet, the data packet comprising packet data and a header, the header comprising an address of a first destination; and
   at least one processor configured to:
      cause transmission of the data packet in the buffer to the first destination in dependence upon the address of the first destination stored in the header of the data packet in the buffer;
      receive from the host computing device, a message indicating one or more fields of the header of the data packet to be updated;
      in response to receiving the message and following the transmission of the data packet to the first destination, overwrite only the one or more fields of the header of the data packet stored in the buffer as indicated by the received message, from the address of the first destination to an address of a second destination; and
      cause transmission of the data packet in the buffer to the second destination in dependence upon the address of the second destination in the header of the data packet.

2. The network interface device as claimed in claim 1, wherein the at least one processor is configured to receive the address of the first destination and the address of the second destination from the host computing device.

3. The network interface device as claimed in claim 1, wherein overwriting the address of the first destination with an address of a second destination, comprises overwriting the header containing the address of the first destination with a further header containing the address of the second destination.

4. The network interface device as claimed in claim 1, wherein the buffer is associated with an address space of the host computing device.

5. The network interface device as claimed in claim 1, wherein the data in the buffer comprises at least part of a data transmission unit.

6. The network interface device as claimed in claim 1, wherein the buffer is a size of one or more data transmission units.

7. The network interface device as claimed in claim 1, wherein the buffer is a scratch pad memory.

8. The network interface device as claimed in claim 1, wherein the packet data in the buffer comprises first data that is transferred in a first data transfer from the host computing device, wherein the buffer is configured to store data for one or more further data transmissions received in one or more further data transfers.

9. A data processing system comprising:
   the network interface device as claimed in claim 1; and
   the host computing device.

10. The data processing system as claimed in claim 9, wherein the host computing device comprises at least one processor configured to execute computer readable instructions to:
   transfer the data to the buffer of the network interface device;
   transfer the address of the first destination to the buffer; and
   transfer the address of the second destination to the buffer to overwrite the address of the first destination in the buffer.

11. The data processing system of claim 10, comprising an indicator store configured to store a doorbell indicating that the data has been transferred to the buffer, wherein the doorbell is associated with a descriptor identifying the data in the buffer.

12. The data processing system of claim 10, comprising a descriptor ring for storing one or more descriptors for one or more data transfers, at least one of the descriptors pointing to the buffer on the network interface device.

13. The data processing system of claim 12, wherein the descriptor ring is further configured to store a command for the network interface device.

14. The data processing system of claim 10, wherein the at least one processor of the host computing device is configured to execute instructions to transfer the data for transmission to the buffer according to a first mode,
wherein the data processing system is further configured to transfer data according to a second mode.

15. The data processing system of claim 14, wherein the second mode comprises a direct memory access mode of data transfer.

16. The data processing system of claim 14 wherein, in the second mode, the at least one processor of the host computing device is configured to execute instructions to write a descriptor to the descriptor ring, the descriptor pointing to a buffer of the host computing device in which data for transfer is stored.

17. The data processing system of claim 16, wherein the descriptor ring is configured to store descriptors in accordance with a first mode and to store descriptors in accordance with the second mode in an order in which the data transfers associated with the respective descriptors were carried out.

18. A method comprising:
coupling a host computing device to a network;
storing in a buffer, a data packet received from the host computing device, wherein, the data packet comprises packet data and a header, the header comprising an address of a first destination;
cause transmission of the data packet in the buffer to the first destination in dependence upon the address of the first destination in the stored in the header of the data packet in the buffer;
receiving from the host computing device, a message indicating one or more fields of the header of the data packet to be updated;
in response to receiving the message and following the transmission of the data to the first destination, overwriting only the one or more fields of the header of the data packet stored in the buffer as indicated by the received message, from the address of the first destination to an address of a second destination; and
causing transmission of the data packet in the buffer to the second destination in dependence upon the address of the second destination in the header of the data packet.

19. The method as claimed in claim 18, comprising:
transferring the data to the buffer;
transferring the address of the first destination to the buffer; and
transferring the address of the second destination to the buffer to overwrite the address of the first destination in the buffer.

* * * * *